US012380621B2

(12) United States Patent
Agrawal

(10) Patent No.: US 12,380,621 B2
(45) Date of Patent: Aug. 5, 2025

(54) COMPUTER-IMPLEMENTED SYSTEMS AND METHODS FOR GENERATING ENHANCED MOTION DATA AND RENDERING OBJECTS

(71) Applicant: Sankalp Agrawal, Plano, TX (US)

(72) Inventor: Sankalp Agrawal, Plano, TX (US)

( * ) Notice: Subject to any disclaimer, the term of this patent is extended or adjusted under 35 U.S.C. 154(b) by 168 days.

(21) Appl. No.: 18/481,552

(22) Filed: Oct. 5, 2023

(65) Prior Publication Data

US 2024/0144573 A1 May 2, 2024

Related U.S. Application Data

(60) Provisional application No. 63/378,629, filed on Oct. 6, 2022.

(51) Int. Cl.
*G06T 13/40* (2011.01)
*G06T 7/246* (2017.01)
*G06T 15/00* (2011.01)

(52) U.S. Cl.
CPC .............. *G06T 13/40* (2013.01); *G06T 7/246* (2017.01); *G06T 15/00* (2013.01); *G06T 2210/21* (2013.01)

(58) Field of Classification Search
CPC ......... G06T 13/40; G06T 7/246; G06T 15/00; G06T 2210/21; G06T 2210/28
See application file for complete search history.

(56) References Cited

U.S. PATENT DOCUMENTS 10,022,628 B1 * 7/2018 Matsumiya ........... A63F 13/577

OTHER PUBLICATIONS

Blender Documentation Team, "Inverse Kinematics Constraint" [online] [Retrieved May 12, 2025], <URL: https://web.archive.org/web/20220602024008/https://docs.blender.org/manual/en/latest/animation/constraints/tracking/ik_solver.html> (Year: 2022).*
Landreneau et al.: "Poisson-based Weight Reduction of Animated Meshes" [online] [Retrieved May 13, 2025], <URL: https://people.engr.tamu.edu/schaefer/research/weightreduction.pdf> (Year: 2009).*
Newcastle University (4): "Physics Tutorial 4: Collision Detection" [online] [Retrieved May 13, 2025], <URL: https://research.ncl.ac.uk/game/mastersdegree/gametechnologies/previousinformation/physics4collisiondetection/2017%20Tutorial%204%20-%20Collision%20Detection.pdf> (Year: 2017).*
Newcastle University (6): "Physics Tutorial 6: Collision Response" [online] [Retrieved May 13, 2025], <URL: http://research.ncl.ac.uk/game/mastersdegree/gametechnologies/previousinformation/physics6collisionresponse/2017%20Tutorial%206%20-%20Collision%20Response.pdf> (Year: 2017).*
GameDevRaw: "Procedural Recoil Animation—FPS Animations Full Tutorial—# 11" [online] [Retrieved May 13, 2025] <URL: https://www.youtube.com/watch?v=wW8MjEfsZ78> (Year: 2021).*

(Continued)

*Primary Examiner* — King Y Poon
*Assistant Examiner* — Vincent Alexander Providence
(74) *Attorney, Agent, or Firm* — Sam Pierce

(57) ABSTRACT

A computer-implemented system, the system comprising: at least one processor; and at least one non-transitory computer-readable medium storing instructions that are executed by the at least one processor to perform operations, comprising: receiving raw motion and/or physics data for a first object, the raw data being captured in a physical setting or provided by prerecorded, programmatically generated, or alternatively animated media sources and comprising data for a plurality of tracking points associated with the first object.

21 Claims, 15 Drawing Sheets

(56) References Cited

OTHER PUBLICATIONS

Solberg: "Transforming animation with machine learning" [online] [Retrieved May 13, 2025] <URL: https://medium.com/embarkstudios/transforming-animation-with-machine-learning-27ac694590c> (Year: 2021).*

Google: "The Discriminator" [online] [Retrieved May 13, 2025] <URL: https://web.archive.org/web/20220903224615/https://developers.google.com/machine-learning/gan/discriminator> (Year: 2022).*

Ashtari: "What Is a Neural Network? Definition, Working, Types, and Applications in 2022" [online] [Retrieved May 13, 2025] <URL: https://www.spiceworks.com/tech/artificial-intelligence/articles/what-is-a-neural-network/> (Year: 2022).*

Rokoko: "How Motion Capture Works in Game Development" [online] [Retrieved May 13, 2025] <URL: https://www.rokoko.com/insights/motion-capture-in-video-games> (Year: 2022).*

* cited by examiner

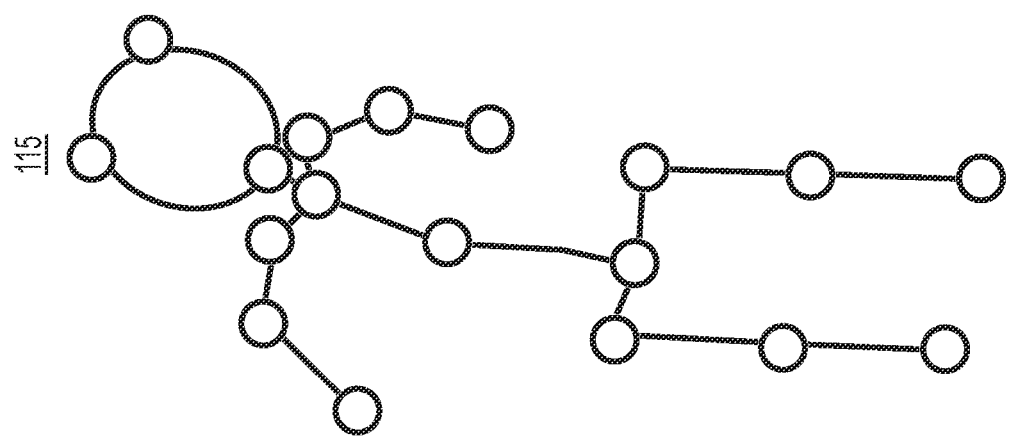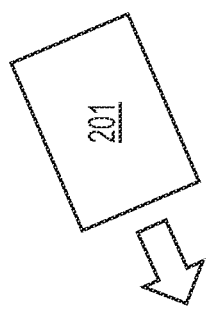
FIG. 3D

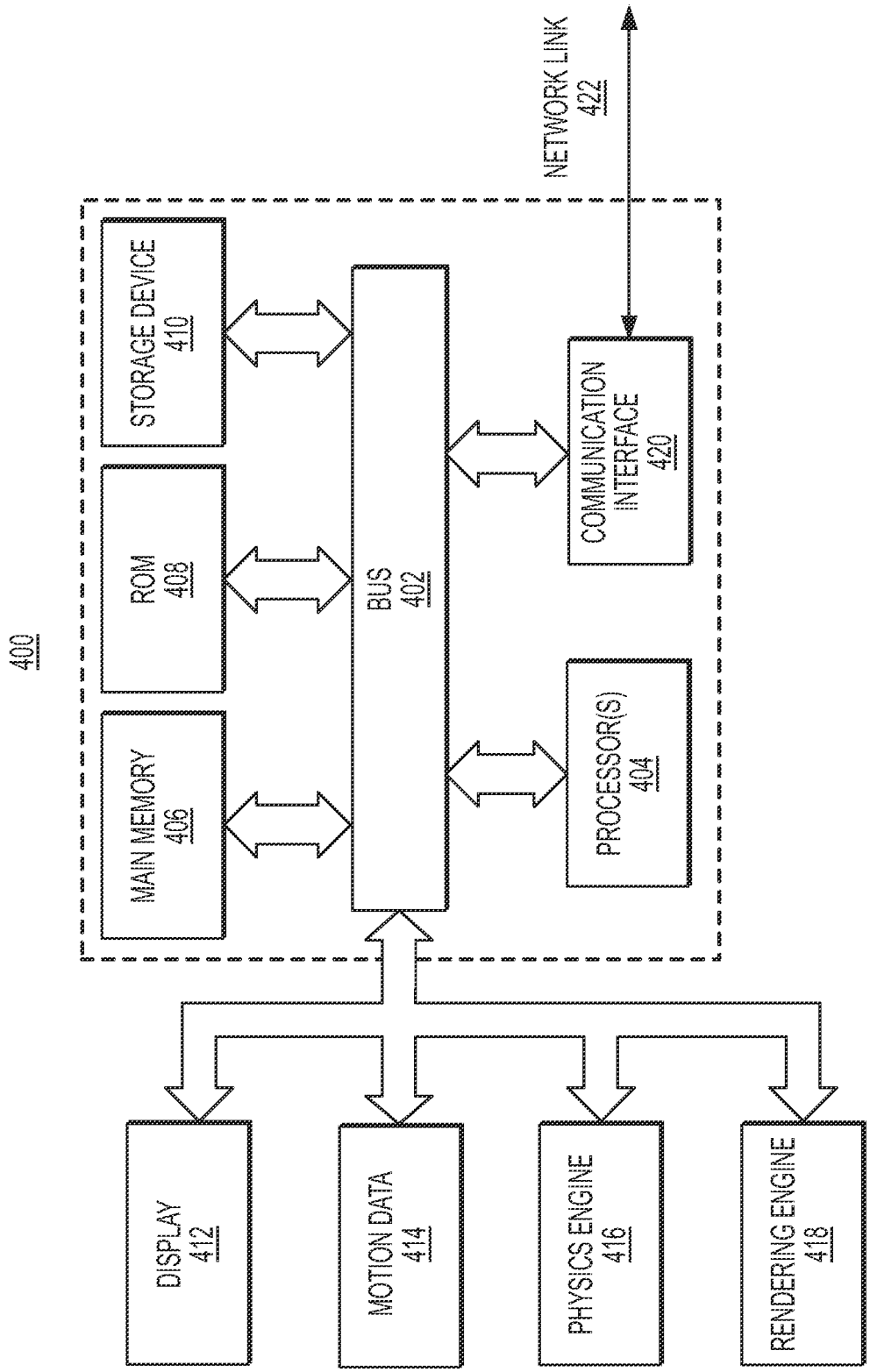

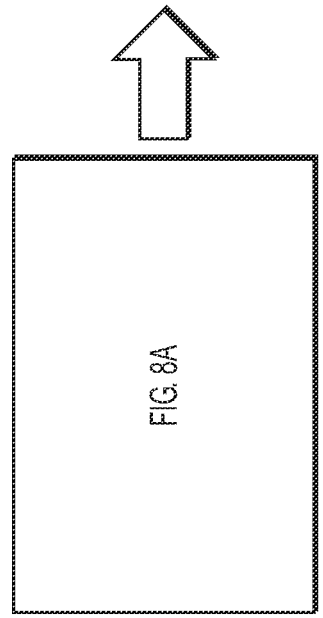
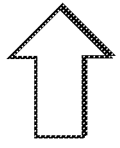
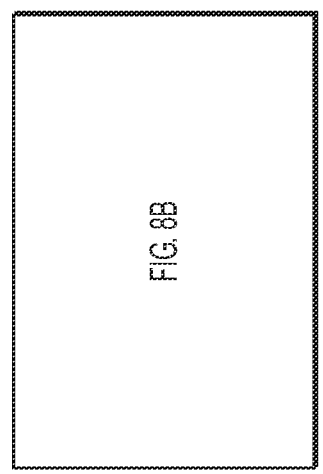
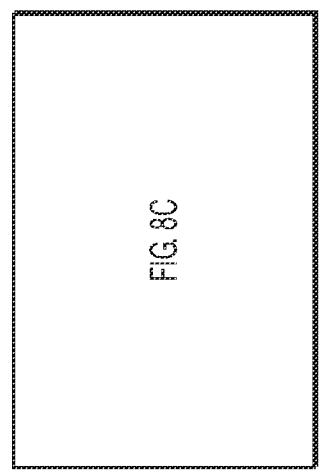
FIG. 7

COMPUTER-IMPLEMENTED SYSTEMS AND METHODS FOR GENERATING ENHANCED MOTION DATA AND RENDERING OBJECTS

TECHNICAL FIELD

The present disclosure generally relates to the field of computing systems and data processing systems and methods. More specifically, and without limitation, this disclosure relates to computer-implemented systems and methods for generating enhanced motion data and rendering objects, such as animated characters. The systems and methods disclosed herein may be used in various applications, including applications that support or provide virtualized settings, video games, filmmaking, and animation. The systems and methods disclosed herein also relate to applications for streaming, recording, and broadcasting content.

BACKGROUND

Extant systems for object animation or virtualization can utilize motion capture ("mo-cap") data to animate a character or other object. Such systems have remained rather limited in terms of their application, fidelity, and/or resulting animation, even when incorporating state of the art graphics or physics engines. For example, pre recorded mocap data may be used for characters whose skeletons and resultant animations are influenced by external forces (e.g., collisions with a moving object, interactions with other characters, effects of forces or an environmental setting, etc.). Since some applications don't aim to be photo-real, pre-recorded sequences or data sets for different collisions and other scenarios are used (e.g., a character experiencing an impact from jostling with another character until they fall and triggering a falling animation for the character) and the resultant animation may be acceptable for the intended purpose. However, for applications striving for photo-real results, such approaches for character animation are insufficient and lacking for the intended objectives and user experience.

With the advancements in computer processing and data throughput, some have theorized that more comprehensive modeling can be applied to increase the quality of animation and the overall user experience. However, extant approaches require high levels of calculations to truly replicate the nuances of character collision, jostling, and other scenarios. With extant systems, such in-depth modeling becomes very computationally expensive, particularly for a dynamic body such as a character represented by a human skeleton that not only has a network of joints with mass distributed unevenly among them, but replicates a conscious entity that responds to colliding forces and typically applies its own force in response. With the addition of live mocap data, an even more complex problem arises for which creating realistic motion in real-time demands an exceedingly large amount of calculations that would be both highly taxing and expensive to produce the necessary level of animation or virtualization.

In view of the foregoing drawbacks and technical challenges, there is a need for improved computing and data processing systems, including improved computer-implemented systems and methods for rendering animated characters and other objects with greater efficiency and results. There is also a need for improved computer-implemented systems and methods for using motion data to render objects, including animated characters. Such systems and methods are needed for various applications, including applications that support virtualized environments, video games, filmmaking, and animation, for example.

SUMMARY

Consistent with embodiments of the present disclosure, systems, methods, and non-transitory computer-readable media are provided for providing enhanced motion data and rendering objects. Embodiments of the present disclosure relate to computer-implemented systems and methods that may be used for a variety of applications, including where there is a need to display realistic animations of objects in a virtualized setting. Embodiments of the present disclosure also relate to systems and methods for providing improved character animations for virtual reality, filmmaking, video games, broadcasting, recording, and streaming of content.

Consistent with the present disclosure, a system of one or more computing apparatuses may be configured to perform particular operations or actions by virtue of having software, firmware, hardware, or a combination of them installed thereon that in operation causes or cause the computing apparatus to perform the operations or actions. One or more computer programs may be configured to perform operations or actions by virtue of including instructions that, when executed by a data processing apparatus (such as one or more processors), cause the apparatus to perform such operations or actions.

One aspect of the present disclosure includes a computer-implemented system, the system comprising at least one processor; and at least one non-transitory computer-readable medium storing instructions that are executed by the at least one processor to perform operations, comprising: receiving raw motion data for a first object, the raw motion data being captured in a physical setting and comprising data for a plurality of tracking points associated with the first object; rendering the first object in a virtualized setting based on the raw motion data; detecting, in the virtualized setting, a collision with a second object based on an entry of the second object within a trigger area associated with at least one tracking point of the first object; generating, in response to detecting the collision with the second object, enhanced motion data for the least one tracking point of the first object, wherein generating the enhanced motion data includes determining a displacement of the at least one tracking point of the first object based on at least a force vector of the second object during a collision phase between the first object and the second object; and further rendering, based on the enhanced motion data, the first object in the virtualized setting.

In some aspects, the operations performed by the at least one processor further comprise generating the enhanced motion data for the at least one tracking point as a function of the raw motion data and the determined displacement of the at least one tracking point.

In some aspects, the operations performed by the at least one processor further comprise generating enhanced motion data for other tracking points proximate to the at least one tracking point of the first object.

The operations performed by the at least one processor may further comprise determining a displacement for each of the other tracking points proximate to the at least one tracking point of the first object, the determined displacement for each of the other tracking points proximate to the at least one tracking point being dependent on a number of degrees of separation of each of the other tracking points from the at least one tracking point.

The operations performed by the at least one processor may further comprise determining a displacement for each of the other tracking points proximate to the at least one tracking point by applying a weighting value based on the number of degrees of separation. In some aspects, the weighting value is a tunable parameter.

In some aspects, the operations performed by the at least one processor further comprise determining a displacement for each of the other tracking points proximate to the at least one tracking point by applying an inverse kinematic function. The inverse kinematic function may be tunable.

In some aspects, the computer-implemented system further comprises a physics engine including at least one processor configured to generate the enhanced motion data for the least one tracking point of the first object and the other tracking points proximate to the at least one tracking point.

In some aspects, the operations performed by the at least one processor further comprise generating recovery data for the first object during a recovery phase after the collision phase, wherein the recovery data is generated for the at least one tracking point of the first object and the other tracking points proximate to the at least one tracking point. In some aspects, the operations performed by the at least one processor further comprise rendering the first object in the virtualized setting based on the recovery data.

The operations performed by the at least one processor may further comprise generating the recovery data by applying at least one of an interpolation model or a tunable recovery model.

In some aspects, the operations performed by the at least one processor further comprise determining a duration of at least one of the collision phase and the recovery phase based on a momentum decay function. The momentum decay function may be tunable.

In some aspects, the operations performed by the at least one processor further comprise applying a physics engine to generate the enhanced motion data during a sequence of phases, including: a pre-collision phase prior to the entry of the second object into the trigger area; the collision phase, the collision phase initiating upon the entry of the second object into the trigger area and terminating upon a rendering of the first object with a maximum displacement resulting from the collision with the second object; and a recovery phase, the recovery phase initiating upon an end of the collision phase and terminating after a duration determined from a momentum decay function.

In some aspects, the operations performed by the at least one processor further comprise generating, during the collision phase, one or more enhanced collision poses for the first object based on the enhanced motion data, and rendering the first object in the virtualized setting based on the one or more enhanced collision poses.

In some aspects, the operations performed by the at least one processor further comprise generating, during the recovery phase, one or more enhanced recovery poses for the first object based on the enhanced motion data, and rendering the first object in the virtualized setting based on the one or more enhanced recovery poses.

In some aspects, the physics engine comprises a machine learning module to generate one or more enhanced poses of the first object based on the enhanced motion data, wherein the machine learning module is trained using extracted motion data from pre-existing media.

The physics engine may also comprise a machine learning module to generate one or more enhanced poses of the first object based on the enhanced motion data, wherein the machine learning module is trained using reproduced collisions.

The machine learning module may be trained by analyzing the reproduced collisions with a generative adversarial network (GAN), the GAN comparing real animations with the reproduced collisions to detect optimal reproduced collisions.

In some aspects, the raw motion data is captured using at least one of a camera, a motion capture suit, or object detection.

Another aspect of the present disclosure includes a computer implemented method, the method comprising the following operations performed with at least one processor: receiving raw motion data for a first object, the raw motion data being captured in a physical setting and comprising data for a plurality of tracking points associated with the first object; detecting, in the virtualized setting, a collision with a second object based on an entry of the second object within a trigger area associated with at least one tracking point of the first object; generating, in response to detecting the collision with the second object, enhanced motion data for the least one tracking point of the first object, wherein generating the enhanced motion data includes determining a displacement of the at least one tracking point of the first object based on at least a force vector of the second object during a collision phase between the first object and the second object; and further rendering, based on the enhanced motion data, the first object in the virtualized setting.

In some aspects, the method further comprises generating the enhanced motion data for the at least one tracking point as a function of the raw motion data and the determined displacement for the at least one tracking point.

In some aspects, the method further comprises generating enhanced motion data for other tracking points proximate to the at least one tracking point of the first object.

The method may further comprise determining a displacement for each of the other tracking points proximate to the at least one tracking point of the first object, the determined displacement for each of the other tracking points proximate to the at least one tracking point being dependent on a number of degrees of separation of each of the other tracking points from the at least one tracking point.

The method may further comprise determining a displacement for each of the other tracking points proximate to the at least one tracking point by applying a weighting value based on the number of degrees of separation. In some aspects, the weighting value is a tunable parameter.

In some aspects, the method further comprises determining a displacement for each of the other tracking points proximate to the at least one tracking point by applying an inverse kinematic function. In some aspects, the inverse kinematic function is tunable.

In some aspects, the method further comprises generating, with a physics engine, the enhanced motion data for the least one tracking point of the first object and the other tracking points proximate to the at least one tracking point.

In some aspects, the method further comprises generating recovery data for the first object during a recovery phase after the collision phase, wherein the recovery data is generated for the at least one tracking point of the first object and the other tracking points proximate to the at least one tracking point.

The method may further comprise rendering the first object in the virtualized setting based on the recovery data.

Systems and methods consistent with the present disclosure may be implemented using any suitable combination of software, firmware, and hardware. Embodiments of the present disclosure may include programs or instructions that are machine constructed and/or programmed specifically for performing functions associated with the disclosed operations or actions. Still further, non-transitory computer-readable storage media may be used that store program instructions, which are executable by at least one processor to perform the steps and/or methods described herein.

It will be understood that the foregoing description and the following detailed description are exemplary and explanatory only, and are not restrictive of the disclosed embodiments.

BRIEF DESCRIPTION OF DRAWING(S)

Reference will now be made to the accompanying drawings which illustrate exemplary embodiments of the present disclosure. The example drawings include two-dimensional representations of virtual assets existing in a three-dimensional space. In the accompanying drawings.

Figure 3A:
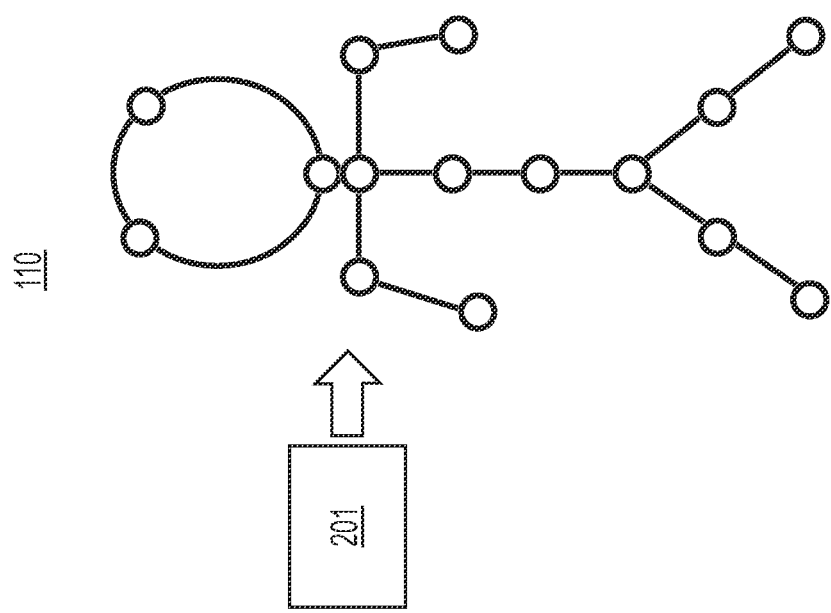
Figure 3B:
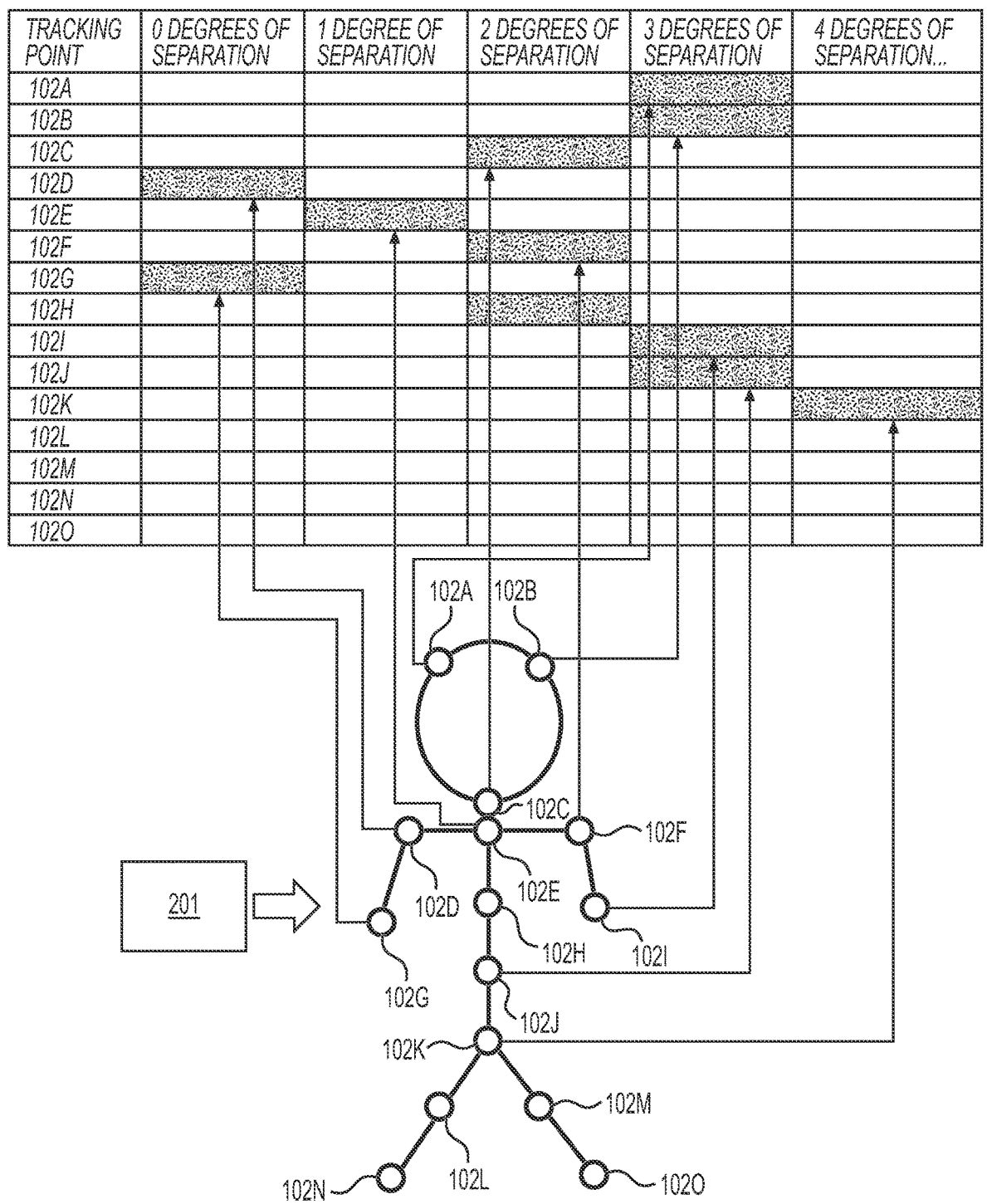
Figure 3C:
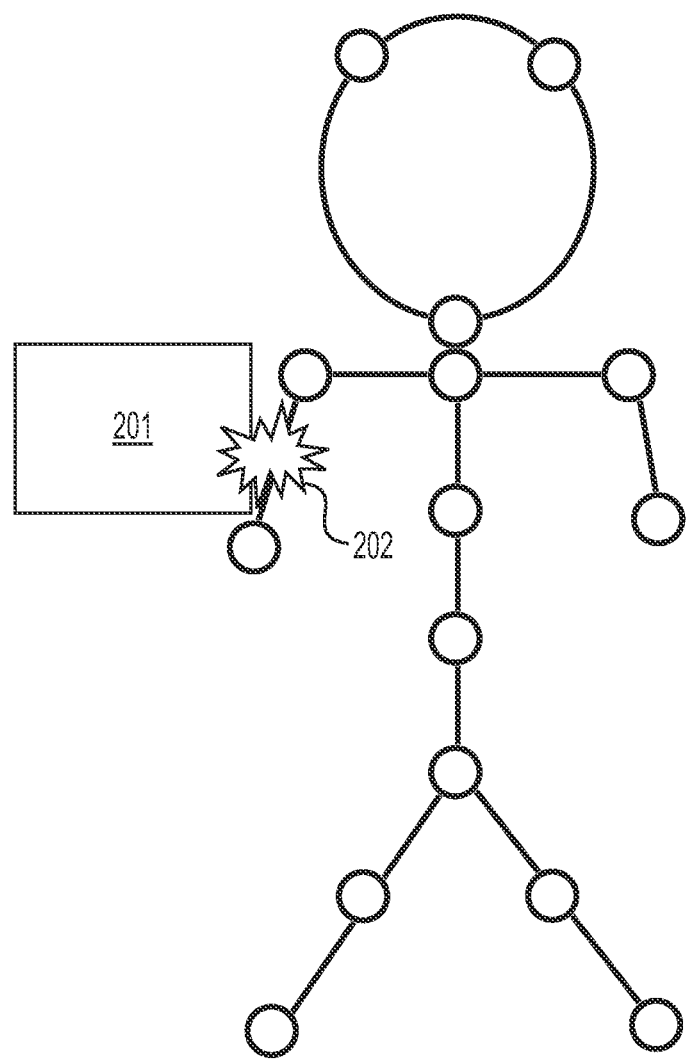

FIG. 3A illustrates an example of a first object prior to a collision with a second object, consistent with embodiments of this disclosure. FIG. 3B illustrates another example of a first object and weighting values associated with tracking points of the first object, consistent with embodiments of this disclosure. FIG. 3C illustrates an example of a collision phase with a second object colliding with a first object, consistent with embodiments of this disclosure. FIG. 3D illustrates an example of a recovery phase of a first object rendered using recovery data after the collision with a second object.

FIG. 4 illustrates an example computing apparatus for implementing systems and methods for generating enhanced motion data and rendering objects, consistent with embodiments of this disclosure.

Figure 5:
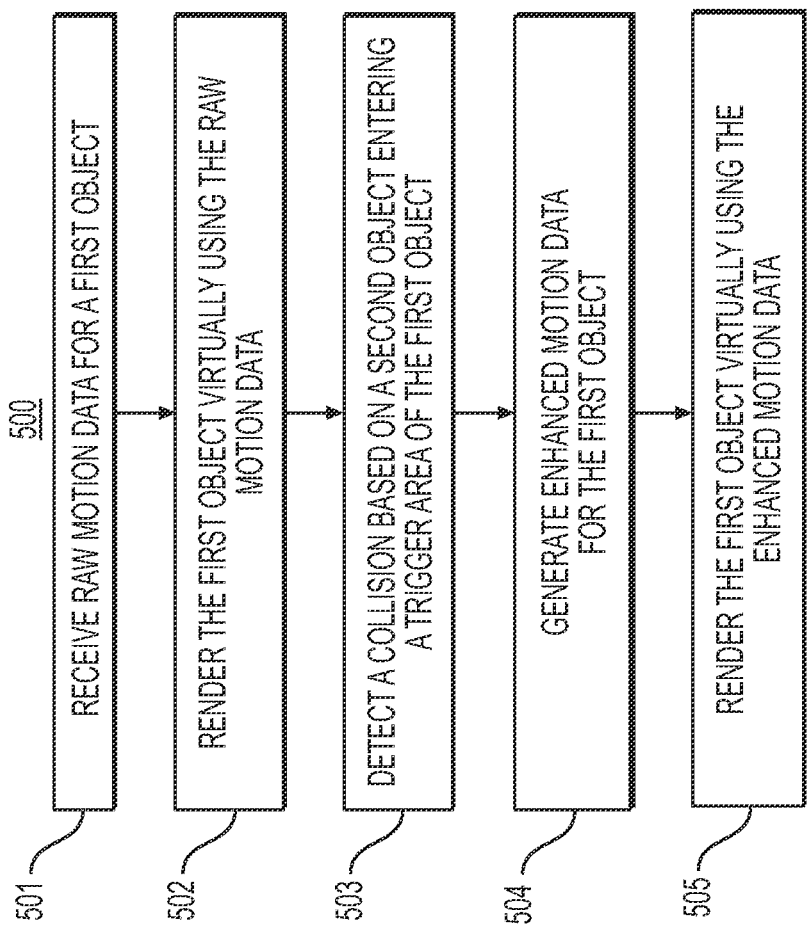

FIG. 5 is a flowchart of an example method for generating enhanced motion data and rendering objects, consistent with embodiments of this disclosure.

Figure 6:
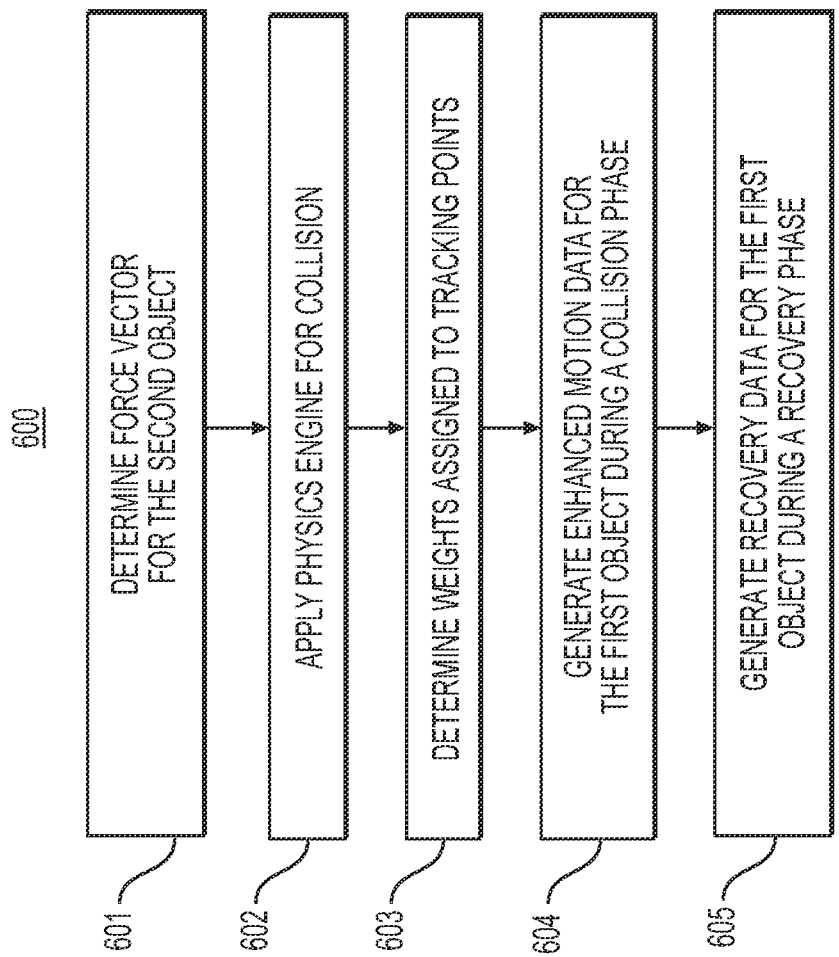

FIG. 6 is a flowchart of an example method for generating enhanced motion data, consistent with embodiments of this disclosure.

Figure 8A:
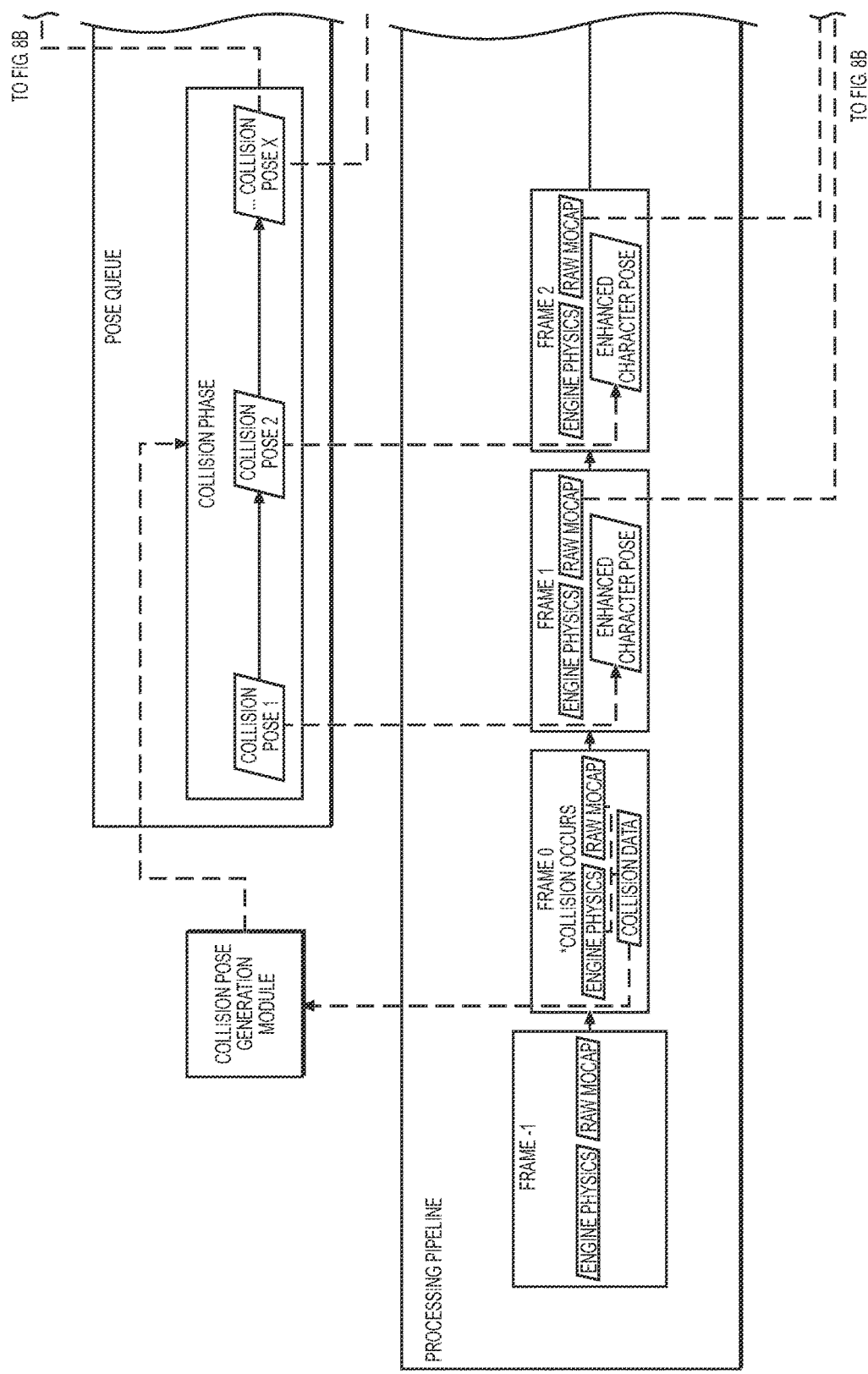
Figure 8B:
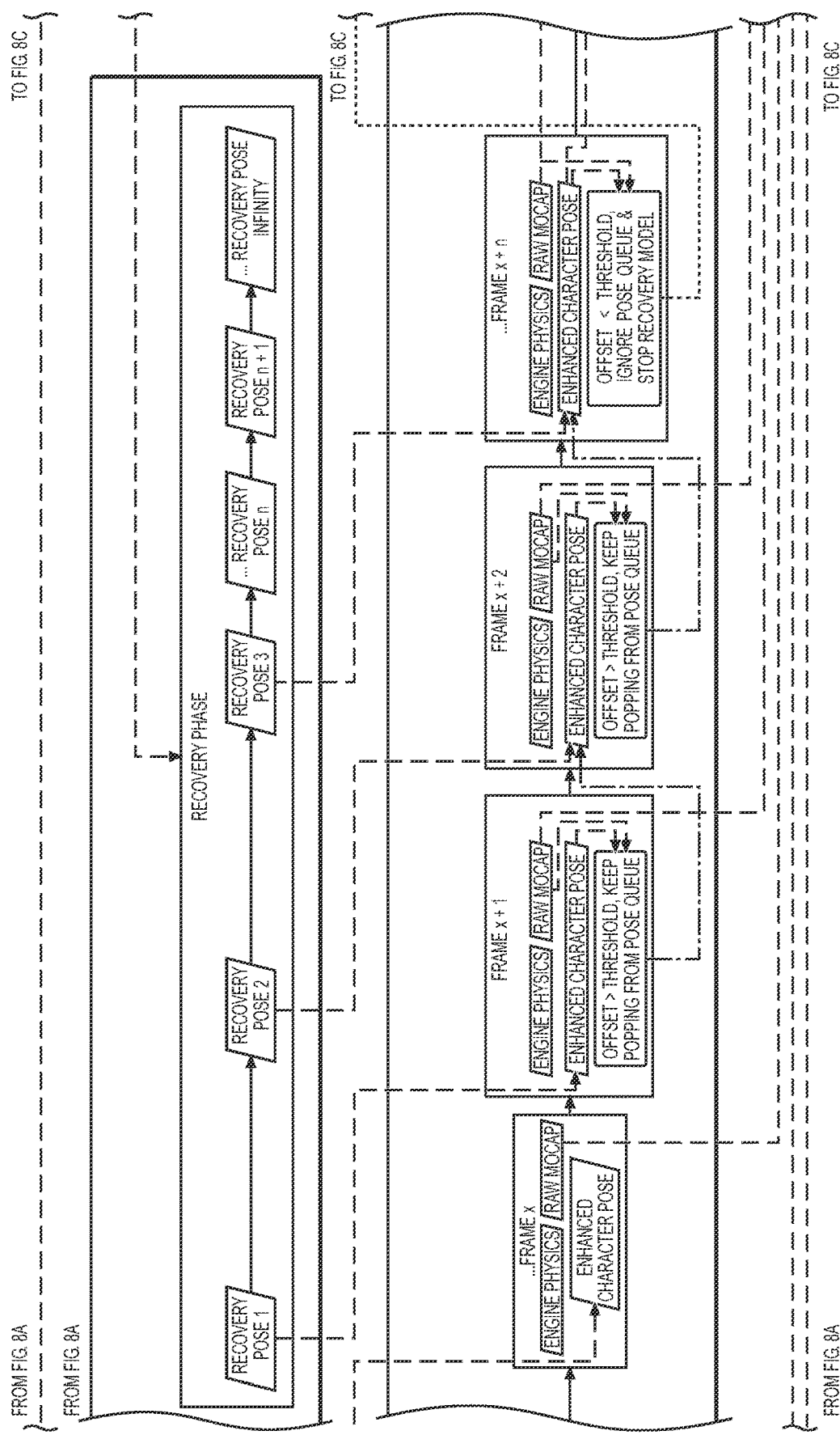
Figure 8C:
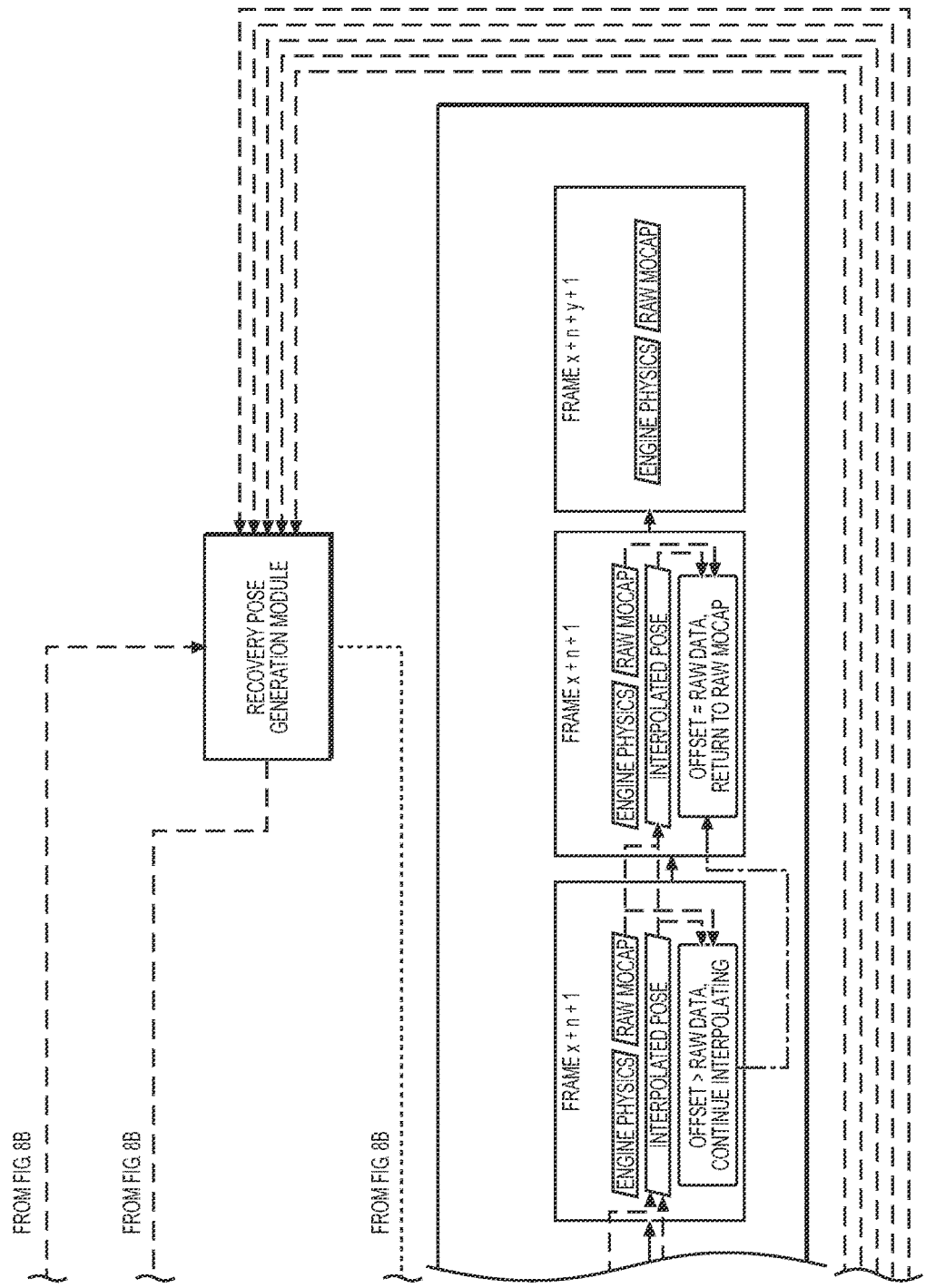

FIG. 7 illustrates the relationship between FIGS. 8A-8C.

FIGS. 8A-8C illustrate an example pipeline for generating enhanced motion data and rendering objects, consistent with embodiments of this disclosure. FIG. 8B is continued from FIG. 8A, and FIG. 8C is continued from FIG. 8B.

Figure 9:
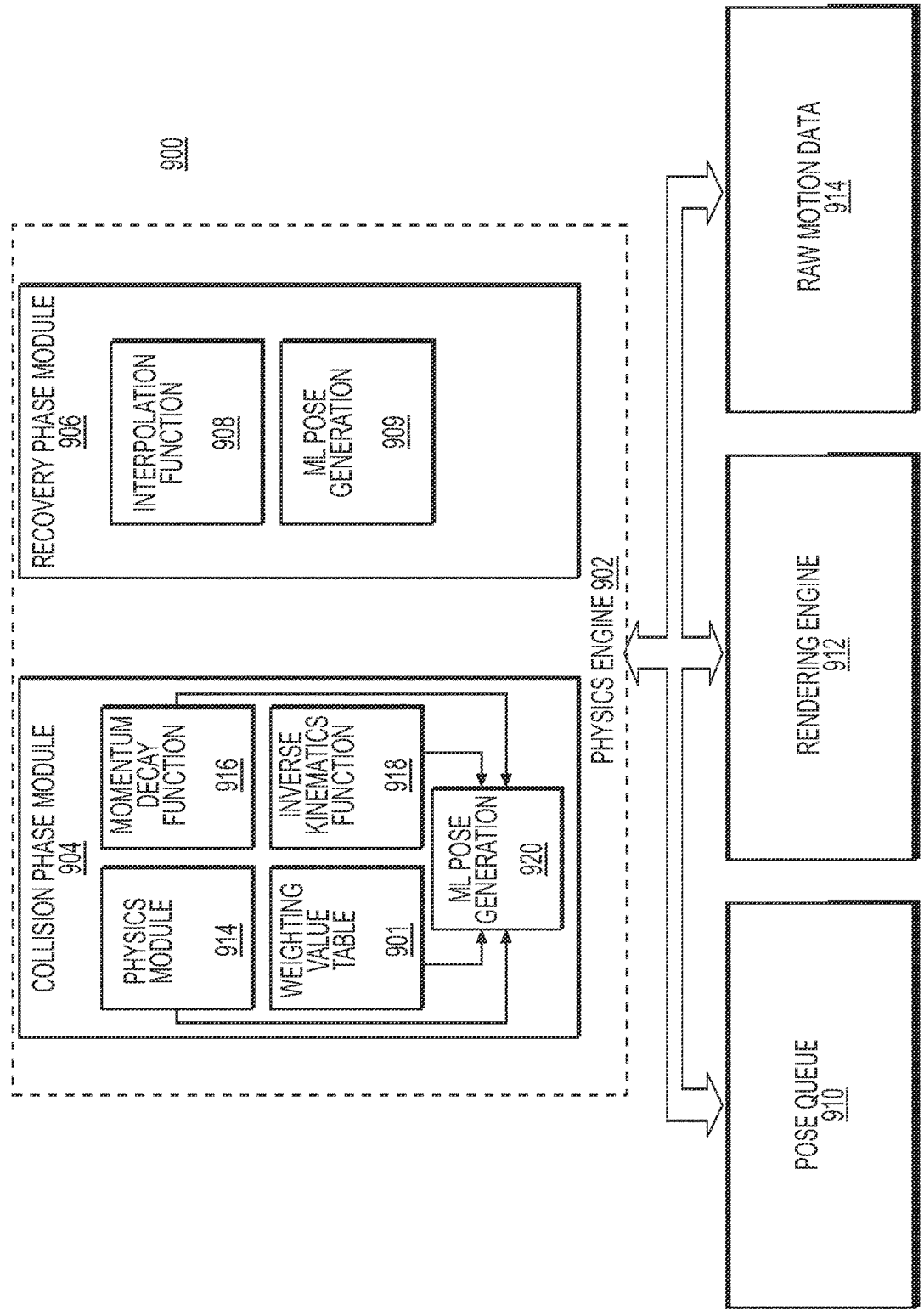

FIG. 9 illustrates an example computing system including a physics engine, consistent with embodiments of this disclosure.

DETAILED DESCRIPTION

Reference will now be made in detail to exemplary embodiments of the computer-implemented systems and methods of the present disclosure, examples of which are illustrated in the accompanying drawings. Wherever possible, the same reference numbers will be used throughout the drawings to refer to the same or like parts. The terminology used in the description presented herein is not intended to be interpreted in any limited or restrictive manner simply because it is being utilized in conjunction with a detailed description of certain specific embodiments. Furthermore, the described embodiments include several novel features, no single one of which is solely responsible for its desirable attributes, or which is essential to the systems and methods described herein.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its purpose is to present some features of one or more embodiments in a simplified form as a prelude to the more detailed description presented later. For convenience, the term "certain embodiments" or "example embodiment" may be used herein to refer to a single embodiment or multiple embodiments of the disclosure.

Embodiments described herein may refer to a non-transitory computer readable medium including instructions that when executed by at least one processor, cause the at least one processor to perform a method or set of operations described herein. Non-transitory computer readable mediums may be any medium capable of storing data in any memory in a way that may be read by any computing device with a processor to carry out methods or any other instructions stored in the memory. The non transitory computer readable medium may be implemented as software, firmware, hardware, or any combination thereof. Software may preferably be implemented as an application program tangibly embodied on a program storage unit or computer readable medium consisting of parts, or of certain devices and/or a combination of devices. The application program may be uploaded to, and executed by, a computing apparatus or machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

Memory may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. Examples of memory include one or more separate storage devices collocated or disbursed, capable of storing data structures, instructions, or any other data. Memory may further include a memory portion including instructions for the processor to execute. Memory may also be used as a working memory device for the processors or as a temporary storage.

Some embodiments may involve at least one processor. A processor may be any physical device or group of devices having electric circuitry that performs a logic operation on input or inputs. For example, at least one processor may include a hardware processor such as one or more integrated circuits (IC), including application specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, and/or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, processors may be separate circuits or integrated in a single circuit. When more than one processor is used, the processors may be configured to operate independently or collaboratively. Processors may be coupled electrically, magnetically, optically, acoustically, mechanically or by other means that permit them to interact.

Consistent with the present disclosure, some embodiments may involve a network for receiving or storing data, as well as for providing, streaming, or broadcasting content, for example. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public, wired network and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In some embodiments, machine learning algorithms may be trained using training examples, such as the training data or cases described below. Some non limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, inverse kinematic algorithms, recursive neural network algorithms, linear machine learning models, non-linear machine learning models, predictive machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some embodiments, the hyper-parameters are set according to the training examples and the validation examples, and the parameters are set according to the training examples and the selected hyper-parameters. The machine learning algorithms may be further retrained based on any output.

Certain embodiments disclosed herein may include computer implemented systems and methods for performing operations or methods comprising a series of steps. The computer-implemented systems and methods may be implemented by one or more computing devices, which may include one or more processors as described herein. The computing device may be one or more computers or any other devices capable of processing data. Such computing devices may include a display such as an LED display, augmented reality (AR), or virtual reality (VR) display. However, the computing device may also be implemented in a computing system that includes a back end component (e.g., as a data server), or that includes a middleware component (e.g., an application server), or that includes a front end component (e.g., a user device having a graphical user interface or a Web browser through which a user may view an embodiment of the systems and techniques described here), or any combination of such back end, middleware, or front end components. The components of the system and/or the computing device may be interconnected by any form or medium of digital data communication (e.g., a communication network). Examples of communication networks include a local area network ("LAN"), a wide area network ("WAN"), and the Internet. The computing device may include clients and servers. A client and server may be remote from each other and may interact through a communication network. The relationship of client and server arises by virtue of computer programs running on the respective computers and having a client-server relationship to each other.

Some embodiments of the present disclosure may include systems, methods, and non-transitory computer-readable media for recording or otherwise capturing activity at one or more physical or virtual locations. Such activity may be collected and transmitted by one or more different recording and/or computer devices. As further disclosed herein, the recording and/or computer devices may be interconnected and/or communicatively coupled to a data integration server or a collection of servers.

Systems and methods consistent with the present disclosure may be implemented for generating enhanced motion data and rendering objects, such as animated characters. The systems and methods disclosed herein may be used in various applications, including applications that support or provide virtualized environments, video games, filmmaking, and animation. The systems and methods disclosed herein also relate to applications for streaming, recording, and broadcasting content. Embodiments of the present disclosure also relate to systems and methods where raw motion data for a first object is captured and adjusted in response to collisions or forces in a virtualized setting, such as a collision between the first object with one or more other objects in the virtualized setting.

As further disclosed herein, improved computer-implemented systems and methods are provided for rendering animated characters and other objects with greater efficiency and results. The computer-implemented systems and methods disclosed herein provide innovative solutions for using motion data to render objects, including animated characters. Advantageously, systems and methods of the present disclosure can provide greater processing efficiencies and more realistic renderings of objects and interactions in a virtualized setting.

A "virtualized setting," as used herein, refers to a setting, scene, or environment that is virtualized though computer graphics and represented by a video sequence presented on a display device capable of displaying the video sequence. The display device may present a display, e.g., a mixed reality display, a spatial computing display, a volumetric display, a digital human display, or any other virtual, digital, or computer display. The video sequence may comprise a plurality of frames which, in combination, create a scene. A scene or setting may comprise one or more simulated objects that are positioned in a virtual coordinate space within a view space. By showing frames in succession and sequential order, the simulated objects appear to move. Within the virtualized setting, an animation of a first simulated object (a "first object") is displayed alongside other simulated objects (a "second object" and so on) and a simulated background. In some embodiments, the first object resembles a human character. In other embodiments, the first object resembles a non-human object. The other objects may resemble other human characters or other non-human objects. The background may be static or animated (i.e., dynamic).

A "frame," as used herein, refers to an image of a video sequence. A frame may provide a view into a computer-generated scene at a particular time or during a short time window. For example, with a 60 frame-per-second video, if one frame represents the scene at t=0, then the next frame would represent the scene at t=1/60 second. In some embodiments, a sequence of frames may represent the scene over a period of time. More generally, each frame represents a snapshot in time.

The simulated objects can be generated by or from mathematical models describing the shape and features of the objects (such as arms and a torso described by a set of plane and/or curved surfaces), stored or pre-recorded images (such as the face of a person), machine learning techniques, and/or any combination thereof. When rendering an object (such as with one or more rendering engines), data may be used to indicate where each object or portion of an object is in a scene and its movements over a sequence. For example, tracking data for one or more points of an object may be used for tracking and rendering an object.

A "pose," as used herein, refers to a set of enhanced motion data for a combination of tracking points related to a first object for a given frame within a sequence of frames. The pose may be an enhanced collision phase pose of the simulated first object based on enhanced collision data or the pose may be an enhanced recovery phase pose of the simulated first object based on enhanced recovery data. The enhanced collision data and/or the enhanced recovery data may be generated using any of the above-mentioned techniques.

Animation includes the process of generating successive scenes such that when the corresponding frames are displayed in sequence, animated characters or other objects in the scene appear to move. Where the character represents a human or other life form, it preferably moves in a natural-looking manner. One approach to conveying natural movement of an object is to use motion capture data (i.e., "raw mo cap data" or "raw motion data"). For example, physical characters, such as actors, may have sensors attached to their bodies or suit to capture raw motion data. As the actor moves through various motions in a physical setting (e.g., a stage or filming location), a camera and/or other system captures the actor's movement and stores the raw motion data. The actor may perform various movements while wearing the sensors and being placed near a screen displaying a simulated scene in the background. A first object representing a human character can be rendered using the motion data so that its movements follow the motion recorded from the motions of the actual physical character.

Extant systems using motion capture data have several drawbacks. For example, such systems are not very dynamic in that the motion data is replayed exactly as recorded or the system may only be able to apply basic forms of warping or blending. As a result, the virtualized settings are forced to prevent or ignore dynamic situations that may occur between objects and/or in specific sequences. Situations like these are thereby often avoided or handled incorrectly and can result in unrealistic animation within the virtualized setting. The embodiments of the present disclosure can address these and other drawbacks of extant systems.

A "physics engine," as used herein, refers to at least one processor configured to process raw motion data and generate enhanced motion data for a first object. "Raw motion data," as used herein, refers to motion data captured in a physical setting. "Enhanced motion data," as used herein, refers to raw motion capture data that is adjusted by a physics engine and/or other computer-implemented module to simulate a movement of a first object in a virtualized setting where it interacts with other objects and forces. The movement of the first object may be simulated, e.g., in response to a collision between the first object and a second object. A "second object," as used herein, refers to any other object, human or non-human, which collides or otherwise contacts or interacts with the first object. The second object may be, e.g., a solid object such as another character or a projectile, or a fluid object such as water or wind.

"Tracking point(s)," as used herein, refers to tracking locations of an object, such as a first object. The tracking points may be positioned in or along a boundary of a shape of a first object. In some embodiments, tracking points may correspond to points in a skeleton or a frame representing an object. In some embodiments, the tracking points may correspond to joints of a first object, such as joints between parts of the first object. For example, the tracking points of a first object may correspond to joints between bones of an animated character. In another example, the tracking points of a first object may correspond to equally spaced locations along the frame of a non-human object (e.g., a spherically shaped inanimate object such as a ball). Tracking points each comprise coordinates which determine the positioning of each tracking point, and thereby the positioning of each portion of the first object, within the virtualized setting. The coordinates for each tracking point and movement thereof over time may be part of or determined from raw motion data captured for an object or, alternatively, by or from enhanced motion data generated for the object. A combination of tracking points representing the first object at a given point in time (e.g., for a particular frame within the virtualized setting) may be used to generate a pose of the first object in a given frame.

A "trigger area," as used herein, refers to an area surrounding a tracking point. By way of an example, a collision may be detected when a second object enters a trigger area for a tracking point of a first object. When a collision is detected, at least one physics engine may be initiated or applied to generate enhanced motion data for the first object. As further disclosed herein, the physics engine may also be configured to generate enhanced poses for the first object and transmit the enhanced poses to the rendering engine or store them in queue. A "rendering engine," as used herein, refers to at least one processor that is configured to perform algorithms or processes for displaying a virtualized setting with objects, including poses of a first object generated from raw motion data, enhanced motion data, or a combination thereof. In some embodiments, the physics engine and rendering engine are implemented with any suitable combination of computer hardware, software, and/or firmware to perform the operations, functions, and features described herein.

As disclosed herein, the present embodiments provide systems and methods for enhanced motion data and improved animation of objects in a virtualized setting. Among other features, the disclosed systems and methods implement an improved physics engine to generate enhanced motion data to account for two colliding objects in the virtualized setting. The enhanced motion data may be generated based on the raw motion data associated with at least one of the two colliding objects. In some embodiments, the systems and methods described herein may comprise a set of algorithms or machine-learned functions (e.g., neural networks), which are trained using real world and/or virtually created data to generate enhanced motion data to provide more realistic information regarding how a first object would engage, interact, react, and/or be displaced in response to an outside force, e.g., a collision with a second object or interaction with another force. In some embodiments, enhanced data is also generated to provide information regarding how the first object would recover to its original position or another position (i.e., to the instantaneous raw motion data). The animation is created without requiring the full set of calculations which would otherwise be necessary for generating such data.

In some embodiments, the systems and methods include the implementation of a first data layer for a first object comprising at least one tracking point per joint of the shape of the first object. Each tracking point within the first data layer may carry or be associated with an array of first weights. The first weights for a particular collision may be determined based on the location of the colliding object and each tracking point's degree of separation from the trigger area(s) corresponding to an impact caused by the particular collision. The first data layer is dynamic in that each tracking point may be assigned a varying first weight depending on, e.g., the particular location on the first object when the second object collides with the first object.

The disclosed systems and methods may further include the implementation of a second data layer for the first object, wherein each tracking point within the second data layer comprises a second weight indicating an impact on that tracking point from the movement of every other tracking point connected or related to that tracking point. The second data layer is static in that each tracking point of a given frame and object is assigned a consistent second weight regardless of, e.g., the particular location on the first object when the second object collides with the first object. Additional data layers accounting for additional forces acting on each tracking point may be provided as well. Furthermore, each of the layers and/or weights may be modifiable and/or tunable (e.g., through a decimal slider or other adjustment tool) to allow for tuning an overall resistance of a given first object or a particular resistance of the given first object to a given or particular type of collision.

According to embodiments of the present disclosure, when a collision occurs in a virtualized setting, the physics data (e.g., one or more force vectors acting on the first object) is provided to a physics engine. In some embodiments, the data is provided to a collision phase machine learning module of the physics engine. Based on parameters associated with the first object, which may be tuned by a user, and the magnitude of the forces acting upon the first object, the collision phase machine learning module of the physics engine calculates the duration of the collision phase, and generates collision data (i.e., enhanced motion data) which is used to create a series of frames comprising enhanced poses for the first object for the duration of the collision phase. The generated collision data comprises, e.g., the coordinates of each tracking point of the first object relative to the coordinates of each tracking point of the first object in a directly preceding frame of the series of frames (or relative to the raw motion data for the first frame of the series of frames for the collision phase). Each enhanced pose from the series of frames for the collision phase may be sequentially added (i.e., pushed) to a pose queue maintained in memory. The pose queue may be communicatively coupled to a rendering engine which sequentially removes the earliest enhanced pose from the pose queue and positions the first object into that enhanced pose within the virtualized setting. The raw motion data continues to be captured and input into the physics engine (e.g., in real time or after recording)—even during the collision phase; however, the raw motion data might not be input into or used by the rendering engine during the collision phase.

In some embodiments, enhanced data may be generated for the first object during a recovery phase. As disclosed herein, the recovery phase may immediately follow the collision phase. Enhanced recovery pose data may be continuously generated by, e.g., a recovery phase machine learning module, which in turn sends the enhanced recovery pose data to generate a second series of frames for the recovery phase, the second series of frames being pushed to a pose queue. For each frame of the second series of frames generated for the recovery phase, the physics engine may monitor the distance between the tracking points of the enhanced pose and the tracking points of the raw motion data. Once the distance between the tracking points of the enhanced pose and the tracking points of the raw motion data falls below a threshold value, any further pose queue data may be disregarded, and an interpolation function may be used to move the enhanced tracking points such that they match the raw motion data tracking points, after which the raw motion data reassumes control of the shape of the first object in the virtualized setting.

In some embodiments, prior to the collision phase but with knowledge of an impending collision, the physics engine may assign weights to each tracking point of the first object, wherein the assigned weights are based on the degree of separation between the particular tracking point and those tracking points that will be directly impacted by the second object (i.e., those tracking point(s) in trigger area(s) of the first object that will make contact with the second object). In some embodiments, all the enhanced poses of the first object are created immediately upon collision, with the enhanced poses being added to a pose queue. In other embodiments, all enhanced collision phase poses are created immediately upon collision. In yet other embodiments, at least one enhanced collision phase pose is created prior to collision.

In still further embodiments, in a recovery phase, a second series of frames is generated that includes enhanced recovery poses of the first object returning to match the real time raw motion data. In some embodiments, depending on hardware capabilities and processor throughput, the recovery phase data generation occurs quickly enough that at least one new enhanced pose is produced within the duration of rendering a single frame of the second series of frames for the recovery phase. In such a case, even if the pose queue is emptied, the rendering engine will still receive a new enhanced recovery pose from newly generated recovery pose data from the physics engine in time for a next rendering of the first object in the virtualized setting. If such calculation speed is met, then constantly producing enhanced recovery poses as quickly as possible is not necessary—in fact, as much updated raw motion data should be taken into account before adding each successive recovery pose, since the raw motion data could continuously be changing. As such, the raw motion data may be used to further adjust existing enhanced poses of the first object stored in the queue. If, however, the calculation speed of creating at least one enhanced pose per frame of the second series of frames for the recovery phase cannot be met, adding as many enhanced poses to the pose queue as possible such that the pose queue does not become empty becomes a priority.

As disclosed herein, components of the present embodiments may be implemented with machine learning functions or modules. Training the machine learning components of the physics engine can help achieve highly realistic movement and animation of objects. Thus, training the machine learning components should be performed with realistic data. The training may comprise at least two different aspects—training data for the collision phase, and training data for the recovery phase.

Training data for the machine learning components for the collision phase may comprise any combination of the following: well-known ragdoll physics rules to provide training data for the collision phase when the force vector(s) of the second object are above a given force vector threshold value; tracked raw motion capture data from simulations of collisions involving moving objects and a crash-test dummy, the crash-test dummy having joints with adjusted tensions which more accurately resemble the structure of a particular character or object; customized animations may be utilized based on particular objects and collisions; extracted motion data, via, e.g., computer vision technology from existing media which contains various types of collisions between various objects; reproduced collisions created by the machine learning model itself, e.g., those reproduced collisions which are determined to be most realistic, may be selected, e.g., by a user or by a GAN, and utilized to further train the model; and/or manually adjusted pre-recorded collision phase data may be utilized to account for variations in movement based on pre-recorded data which is determined to be most realistic.

Training data for the machine learning components of the recovery phase may comprise any combination of the following: raw motion data collected during the recovery phase to determine a final pose at the end of the recovery phase; enhanced motion data from the final frame of the collision phase to determine an initial character pose at the beginning of the recovery phase; actual or emulated data from the collision phase, e.g., pre-recorded raw motion data as well as corresponding pre recorded force vector data and enhanced motion data, to account for the various force vectors during the collision phase; manually adjusted data from the collision phase to account for variations in movement based on pre-recorded and realistic data; and/or reproduced recovery data created by the machine learning module itself, e.g., those reproduced recoveries which are determined to be most realistic, may be selected, e.g., by a user or by a GAN, and utilized to further train the model.

Figure 1A:
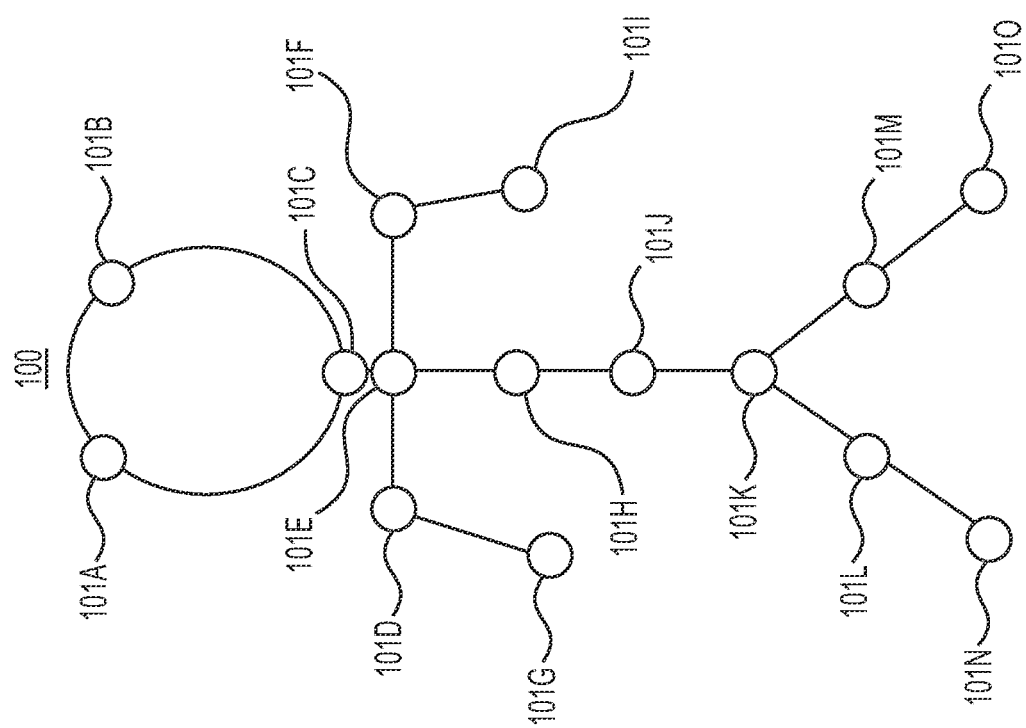
FIG. 1A illustrates an example of a first object with a plurality of tracking points, consistent with embodiments of this disclosure.

Turning now to the drawings, FIG. 1A illustrates an example of a first object 100, consistent with embodiments of this disclosure. Although the first object 101 is represented in a two-dimensional space within the figure, it should be understood that the virtualized setting may comprise the first object and other virtual assets represented in a three-dimensional space. First object 100 includes a plurality of tracking points 101A-101O. In a virtualized setting, each tracking point of the plurality of tracking points 101A-101O may be represented with coordinates in three-dimensional space (e.g., X, Y, Z coordinates). In this example, the first object 100 represents a human character and a frame or skeleton is used to track its position and movements for animating or rendering the character in a virtualized setting. Tracking points 101A-101O are positioned in or along the skeleton. In some embodiments, one or more of the tracking points 101A-101O correspond to a joint of the skeleton of the first object 100 (e.g., an elbow, a knee, or a finger joint). In some embodiments, raw motion data for each of the tracking points 101A-101O is captured and/or received for processing, from frame to frame, by a physics engine, for example. As disclosed herein, enhanced motion data may be generated for one or more tracking points to take into account displacements due to collisions or other forces influencing the positioning of the first object 100 in the virtualized setting. In the example of FIG. 1A, the motion data is associated with a two dimensional shape and positioning of the first object 100; however, it will be understood that the motion data may alternatively be associated with a three-dimensional shape and positioning of the first object (not shown in FIG. 1A). From the motion data and other data related to the character of the first object 100 (e.g., data defining an exterior skin of the character), a rendering engine may generate a fully animated version of the first object 100 including its movements in a virtualized environment.

In some embodiments, each of the tracking points 101A-101O further comprises or is associated with a trigger area (not shown in FIG. 1A). A trigger area may be a predefined area (such as a circle, a square, or a rectangle) centered on or around a tracking point. The trigger area of each tracking point may be used to detect a collision with a second object. As disclosed herein, upon entry of the second object into a trigger area, a physics engine may be initiated and executed to generate, for example, enhanced motion data and/or enhanced collision poses for the first object 100. In some embodiments, the trigger area is larger than the respective tracking point itself, such that the initiation of the running of the physics engine occurs prior to a moment of collision, thereby allowing the physics engine to generate enhanced motion data and/or at least one enhanced collision pose and to push the at least one enhanced collision pose to a pose queue, as further described below.

Referring again to FIG. 1A, the data for the plurality of tracking points 101A-101O may include raw motion data captured based on, e.g., the real time movement of an actor or person for the first object 100 who is in a physical setting (such as a stage, a studio, a filming location, a playing field, a sports arena, or other non virtual setting) and whose movements are captured or provided by at least one of, e.g., a sensor, a camera, a recording, a computer imaging technology, and/or a motion capture suit comprising sensors representing each tracking point. The raw motion data may include coordinate or location data of each tracking point 101A-101O, and any changes thereof over time. In some embodiments, the raw motion data may include other data such as a force vector or force data. As disclosed herein, motion data (including raw motion data and/or enhance motion data) may be used to animate the movement of the first object 100. In some embodiments, enhanced motion data may be calculated for tracking points of first object 100 including at and proximate to the location of a collision with a second object or impact with an external force in the virtualized setting.

Figure 1B:
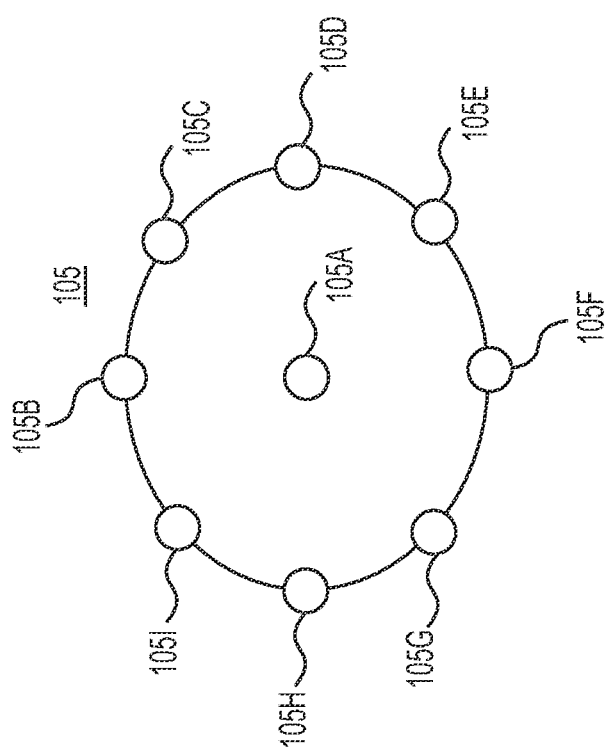
FIG. 1B illustrates another example of a first object with a plurality of tracking points, consistent with embodiments of this disclosure.

FIG. 1B illustrates another example a first object 105 with a plurality of tracking points 105A-105I, consistent with embodiments of this disclosure. In this example, the first object 105 represents a non-human character (e.g., a ball or bullet) and a frame or circle is used to track its position and movements for animating or rendering the character in a virtualized setting. Although the first object 105 is represented in a two-dimensional space within the figure, it should be understood that the virtualized setting may comprise the first object and other virtual assets represented in a three-dimensional space. As shown in FIG. 1B, tracking points 105A-105I are positioned in or along the circle representing the first object 105. In a virtualized setting, each tracking point of the plurality of tracking points 105A-105I may be represented with coordinates in a three-dimensional space (e.g., X, Y, Z coordinates). In some embodiments, raw motion data for each of the tracking points 105A-105I is captured and/or received for processing, from frame to frame, by a physics engine, for example. In some embodiments, the raw motion data may include coordinate or location data for each the tracking points 105A-105I, and any changes thereof over time. In some embodiments, the raw motion data may include other data such as a force vector or force data. As disclosed herein, enhanced motion data may be generated for one or more tracking points to take into account displacements due to collisions or other forces influencing the positioning of the first object 105 in the virtualized setting. As disclosed herein, motion data (including raw motion data and/or enhance motion data) may be used to animate the movement of the first object 105. In some embodiments, enhanced motion data may be calculated for tracking points of first object 105 including at and proximate to the location of a collision with a second object or impact with an external force in the virtualized setting.

In some embodiments, each tracking point 105A-105I further comprises or is associated with a trigger area (not shown in FIG. 1B). As disclosed herein, a trigger area may be a predefined area (such as a circle, a square, or a rectangle) centered on or around a tracking point. The trigger area of each tracking point may be used to detect a collision with a second object. Upon entry of the second object into a trigger area, a physics engine may be initiated and executed to generate, for example, enhanced motion data and enhanced collision poses for the first object 105. In some embodiments, the trigger area is larger than the respective tracking point itself, such that the initiation of the running and/or application of the physics engine occurs prior to a moment of collision, thereby allowing the physics engine to calculate enhanced motion data and at least one enhanced collision pose and to push the at least one enhanced collision pose to a pose queue.

Similar to tracking points 101A-101O of FIG. 1A, the raw motion data for the plurality of tracking points 105A-105I of FIG. 1B may be captured based on, e.g., the real time movement the first object 105 located in a physical setting (such as a stage, a studio, a filming location, a playing field, a sports arena, or other non-virtual setting) and whose movements are captured or provided by at least one of, e.g., a sensor, a camera, a recording, a computer imaging technology, or a motion capture suit comprising sensors representing each tracking point. As disclosed herein, with the motion data (including the raw motion data and/or enhanced motion data), the coordinate or location data of each tracking point 105A-105I, and any changes thereof over time, may be used to animate the movement of the first object 105. Further, as disclosed herein, enhanced motion data may be calculated for tracking points of first object 105 at and proximate to the location of a collision with a second object or impact of an external force in the virtualized setting.

Figure 2B:
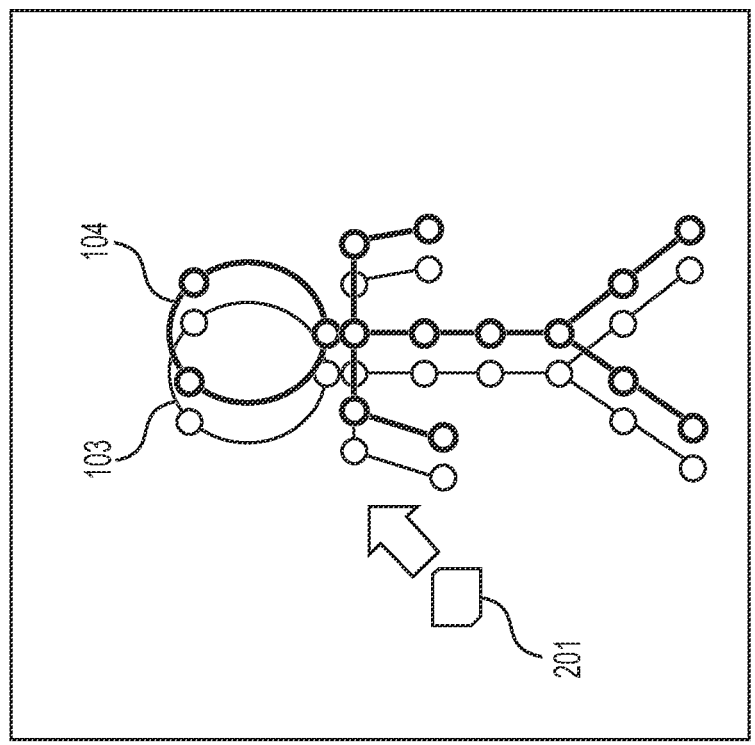
FIG. 2B illustrates another example of a first object after a collision with a second object, consistent with embodiments of this disclosure.
Figure 2A:
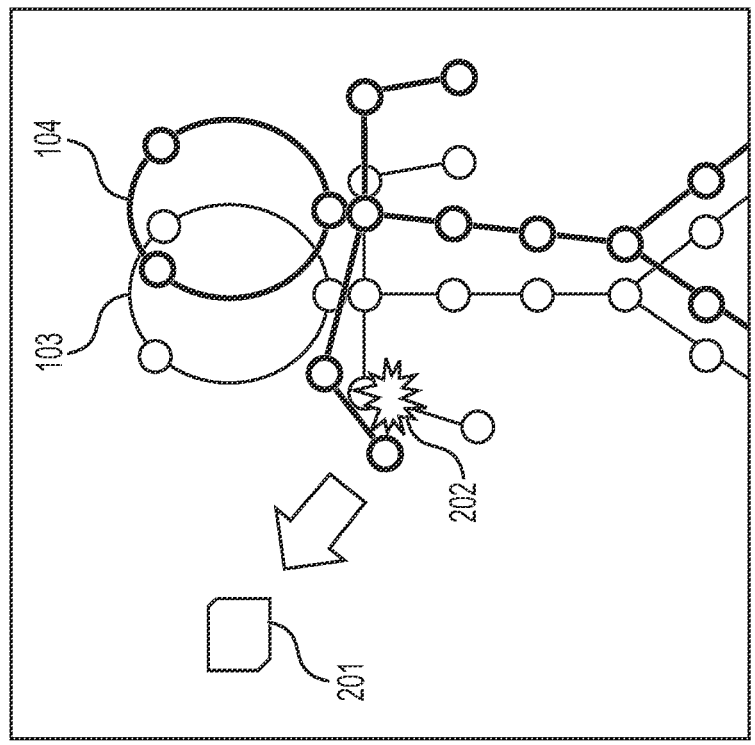
FIG. 2A illustrates an example of a first object prior to a collision with a second object, consistent with embodiments of this disclosure.

For purposes of illustration, FIGS. 2A-2D represent first and second objects in a two-dimensional space. However, it will be understood that a virtualized setting may comprise the first and second objects and other virtual assets represented in a three-dimensional space. Thus, each tracking point of the plurality of tracking points shown in the figures may be represented with coordinates in a three-dimensional space (e.g., X, Y, Z coordinates). FIG. 2A illustrates an example of a first object prior to a collision with a second object, and FIG. 2B illustrates another example of a first object after a collision with a second object, consistent with embodiments of this disclosure. For purposes of illustration, two representations of first object 103, 104 are shown in non-overlapping fashion. The representation 103 includes the tracking points and corresponding raw motion data, and the second representation 104 includes the tracking points and corresponding raw motion data and/or enhanced motion data. In FIG. 2A, which shows the first object prior to a collision with a second object 201, there is no difference between the raw motion data and enhanced motion data for the first object because there is no applied external force and thus no displacement amount as part of the enhanced motion data (i.e., the raw motion data equals the enhanced motion data). In FIG. 2B, which shows the first object after a collision with the second object 201, there is an external force that created a collision 202 that is at or proximate to a tracking point and one or more other tracking points of the first object. Thus, in the example of FIG. 2B, the raw motion data differs from the enhanced motion data at one or more tracking points associated with the collision, whereas other tracking points that are distant from the collision are not displaced and the raw motion data is equal to the enhanced motion date for these tracking points. In some embodiments, the displacement may be determined based on a force vector of the second object and/or the distance from the collision or degree of separation between impacted tracking points. Embodiments for calculating the displacement and enhanced motion data are provided herein. In some embodiments, the enhanced motion data for a tracking point may be calculated as a function of the raw motion data plus the displacement due to a collision with a second object or impact with an external force.

In some embodiments, the phase prior to the collision with the second object 201 or other external force is referred to as a pre-collision phase. The pre collision phase may be defined as a duration that exists prior to the entry of the second object into at least one trigger area of the first object. In a pre-collision phase, there is no displacement at any tracking point and the raw and enhanced motion data are equivalent, as shown in FIG. 2A. In some embodiments, during the pre-collision phase, no enhanced motion data may be calculating. Advantageously, this can conserve system resources and components such as the physics engine may not be applied or executed to calculate enhanced motion data or enhanced poses for the first object. During a pre-collision phase, the first object may be rendered in a virtualized setting based on raw motion data. The rendering may include positioning and movement of the first object in the virtualized setting. In some embodiments, the rendering is performed using a rendering engine.

Within the virtualized setting, each tracking point of the first object may comprise a trigger area. As disclosed herein, the trigger area of each tracking point may be used to detect, in the virtualized setting, an entry of a second object within the trigger area and thus trigger or initiate a collision phase. In some embodiments, a physics engine or at least one processor may be configured to track object and detect the entry of an object into a trigger area of another object. When a collision is detected, the physics engine or at least processor may be applied or initiated to generate the enhanced motion data. In some embodiments, a physics engine or at least one processor may be configured to run multiple processes, each process being associated with a collision phase and/or related phases (such as a recovery phase) during which enhanced motion data and enhanced poses are generated. As disclosed herein, enhanced motion data may be calculated for the at least one tracking point associated with the triggered trigger area, as well as other tracking points proximate to the at least one tracking point. In some embodiments, the physics engine may also calculate one or more enhanced collision poses and push each enhanced collision pose to a pose queue or storage location. A rendering engine or at least one processor may be configured to render the first object based on the enhanced motion data and/or enhanced collision pose(s).

In some embodiments, a collision phase may be initiated after the detecting of a collision of a first object with a second object or other external forces. The collision phase may be a phase initiating upon the entry of the second object into a trigger area of the first object and terminating upon a rendering of the first object with a maximum displacement resulting from the collision with the second object. As disclosed herein, the displacement for a tracking point of the first object may be based on at least a force vector of the second object and/or other data (such as a weighting value). After the collision phase, a recovery phase may be implemented by a physics engine or at least one processor. The recovery phase may be a phase initiating upon an end of the collision phase and terminating after a duration determined from, e.g., a momentum decay function. During the recovery phase, the physics engine or at least one processor may be configured to generate enhanced motion data and/or one or more enhanced recovery poses for the first object based on the enhanced motion data. Further, the first object may be rendered in the virtualized setting based on the one or more enhanced recovery poses.

In the example shown in FIG. 2B, one or more tracking points of the first object 104 are displaced based on enhanced motion data generated by a physics engine, the displacement occurring in response to the collision 202 between the first object and the second object 201. The displacement is represented in FIG. 2B and can be seen by comparing the tracking points and raw motion data of the first object 103 with the tracking points and enhanced motion data of the first object 104. Consecutive poses of the displaced first object 104 in a virtualized setting may be rendered by a rendering engine. In some embodiments, a pose queue may be provided to store enhanced poses of the first object generated based on enhanced motion data.

The displacement of each tracking point can vary from tracking point to tracking point. In some embodiments, the displacement may be calculated for a tracking point of a first object based on one or more force victors (such as a force vector of a second object that collides with the object, a force vector of the particular tracking point of the first object, or both) and a distance from the collision or degree of separation of the tracking point from a tracking point at or closest to the point of collision. The force vector is representative of a force that includes at least a magnitude and direction of the second object during a collision phase (and, in some embodiments, there is also a force vector with the magnitude and direction of the first object). To calculate each displacement, weighting values may be applied to the tracking points depending on the distance or degrees of separation of each tracking point from a tracking at or closest to the collision with the second object. Further, as disclosed herein, enhanced motion data for each tracking point may be generated by a physics engine or at least one processor as a function of the raw motion data and determined displacement for the tracking point. With the enhanced motion data, the physics engine or at least one processor may generate consecutive enhanced poses of the first object to be rendered by a rendering engine. A pose queue or storage location may be used to store enhanced poses until they are pulled or provided to the rendering engine for rendering the first object in the virtualized setting. Enhanced motion data and enhanced poses may be used to render the first object during a collision phase and a subsequent recovery phase.

FIG. 3A illustrates an example of a first object prior to a collision with a second object, consistent with embodiments of this disclosure. FIG. 3B illustrates another example of a first object and weighting values associated with tracking points of the first object, consistent with embodiments of this disclosure. FIG. 3C illustrates an example of a second object colliding with a first object, consistent with embodiments of this disclosure. FIG. 3D illustrates an example of a first object rendered using enhanced motion data after the collision with a second object. Although the first and second objects are represented in two-dimensional space within the figures, it will be understood that the virtualized setting may comprise the first and second objects and other virtual assets, including their tracking points, represented in a three-dimensional space. Each tracking point may thus be represented with coordinates in a three dimensional space (e.g., X, Y, Z coordinates).

In FIG. 3A, an example of a pre-collision phase is illustrated with a first object 110 prior to a collision with a second object 201. During the pre-collision phase, there is no displacement of the raw motion data, and the first object 110 may be rendered based on the raw motion data for the tracking points of the first object. When a collision with a second object 201 is detected, enhanced motion data may be generated to account for the displacement of one or more tracking points of the first object. FIG. 3B illustrates an example of a first object 115 and weighting values associated with tracking points 102A-102O of the first object. In some embodiments, weighting values for the first object 115 may be stored in an table 301 or memory, and retrieved when generating displacements and enhanced motion data. One or more weighting values may be stored for each tracking point, as shown in FIG. 3B. For example, each tracking point may have a plurality of weighting values assigned to it, with at least one weighting value stored according to the distance or degree of separation of that tracking point from a collision point or tracking point that is at or closest to a collision. The weighting values may be adjustable or tunable. In some embodiments, the weighting values may be set and stored for each object or object type. In some embodiments, the weighting values may be stored for the first object 115 and selected for a tracking point based on the degree of separation for the tracking point. In some embodiments, the weighting values may be based on a force vector of an external force impacting the first object 115 or specific to the collision between the first object 115 and the second object 201 and/or the characteristics of the objects.

In the example of FIG. 3B, the table 301 may include a set of weighting values for each tracking point of the first object 115 in a collision phase. In the table 301, each tracking point is associated with an array of weighting values (e.g., wherein each weighting value is a tunable hyperparameter), each weighting value being defined or associated with a particular number of degrees of separation of that tracking point from the point or location on the first object 115 which directly collides with the second object 201. When generating a displacement or enhanced motion data for a tracking point of the first object 115, a physics engine or at least one processor may select of specific weighting value from the table 301 based on the physics data relating to a specific collision (e.g., based on data relating to the location or point of collision with the second object 201 and the degrees of separation the between the tracking point and the point of collision).

Weighting values may be applied to adjust the determined displacement of a tracking point based on its distance or degrees of separation for the collision. In some embodiments, weighting values may be defined based on collision modeling. By way of example, weighting values provided in the table 301 may range, e.g., from 0 to 1, or from 0 to 100, wherein a greater weight indicates a greater displacement in response to a given impact force from the second object 201. The weighting values may be individually calculated (and further modified) for each tracking point based on both the number of degrees of separation from a point of collision and the modeled strength and/or weight of the first object 115. The strength and/or weight of the object or tracking point related thereto may also be a tunable parameter. For example, a weighting value assigned to a tracking point associated with a shoulder portion of the first object may be less than weighting value assigned to a tracking point associated with a hand of the first object. As will be appreciated, varying the weighting parameters can change the displacement and influence of an external force on tracking points and thus portions of the first object. Advantageously, adjusting the weighting values can help provide more realistic rendering results of the first object and collisions thereto in a virtualized setting.

By way of further example, a greater weighting value may be assigned to a tracking point having fewer degrees of separation from a location of direct collision as compared to a tracking point have a higher number of degrees of separation from the point of collision. As a result, a tracking point having fewer degrees of separation from a point of collision will receive a greater displacement value than a tracking point having a higher number of degrees of separation from the point of collision.

Referring again to the example shown in FIG. 3B, tracking points 102D and 102G of the first object 115 have zero degrees of separation from the point of collision with the second object 201. For this collision, the corresponding weighting values for the tracking points 102D and 102G are the weighting values indexed and/or stored with respect to the "zero degrees of separation" column of the table 301. On the other hand, tracking point 102E, being one degree of separation (i.e., one tracking point) away from the point of collision, is assigned a weight value that is indexed and/or stored with respect to the "one degree of separation" column of the table 301. To further illustrate, tracking points 102C, 102F, and 102H are two degrees of separation (i.e., two tracking points) away from the point of collision, and may each be assigned a weighting value that is indexed and/or stored with respect to the "two degrees of separation" column of the table 301. Tracking points 102A, 102B, 102I, and 102J are three degrees of separation (i.e., three tracking points) away from the point of collision, and may each be assigned a weighting value indexed and/or stored with respect to the "three degrees of separation" column of the table 301. Tracking point 102K is four degrees of separation (i.e., four tracking points) away from the point of collision, and may be assigned a weighting value that is indexed and/or stored with respect to the "four degrees of separation" column of the table 301. Tracking points 102L and 102M are assigned weighting values from the "five degrees of separation" column of the impact table 301 (not shown). Tracking points 102N and 102O are assigned weighting values from the "six degrees of separation" column of table 301 (not shown).

FIG. 3C further illustrates an example of a collision phase with a second object 201 colliding with a first object 115. As disclosed herein, the point of the collision 202 may be at or closest to one or more tracking points of the first object 115. During the collision phase, a physics engine or at least one processor may utilize the indexed and/or stored weighting value corresponding to each tracking point to generate displacement values and set of enhanced motion data. Displacement values may vary from tracking point to tracking point, as disclosed herein. In some embodiments, the enhanced motion data for a tracking point may be calculated as a function of the raw motion data and determined displacement value for the tracking point. The physics engine may generate enhanced motion data for a series of frames which contain sequential poses of the first object in the collision phase with one or more displaced tracking points as a result of the collision. The sequential poses may include enhanced collision poses determined from the enhanced motion data. The pose data may be stored in queue or storage location and read out by a rendering engine for rendering the first object in a virtualized setting or environment.

FIG. 3D illustrates an example of recovery phase during which a first object 115 is rendered using recovery data after the collision with a second object 201. As part of the recovery phase, a physics engine or at least one processor may be configured to generate recovery data for one or more tracking points of the first object 115. In some embodiments, the recovery data is generated for at least one tracking point at or closest to the point of a collision and one or more other tracking points proximate to the at least one tracking point. In some embodiments, the recovery data may be generated by applying an interpolation model and/or a tunable recovery model. For example, to generate the recovery data, the physics engine may utilize an interpolation model (e.g., a linear interpolation, a weighted interpolation, or a custom interpolation function) and/or a tunable recovery module (e.g., a machine learning recovery pose generation module). The duration of the recovery phase may be determined from a momentum decay function. At the end of the recovery phase, there are no displacements, and all tracking points are returned and rendered based on their corresponding raw motion data.

As part of the recovery phase, a physics engine may be configured to generate enhanced recovery poses based on the recovery data. The enhanced recovery poses may be stored in a pose queue or storage location and pulled by a rendering engine to render the first object 115 in a virtualized setting. The enhanced recovery poses may be stored in sequence in the pose queue by the physics engine and subsequently retrieved by the rendering engine in the sequence from the pose queue. The sequence of enhanced recovery poses may be used to render the first object to show its sequence of movements and recovery from displacement caused by a collision or impact with another external force. From frame-to-frame, movements and displacements may be rendered based on coordinate or location data of each tracking point of a pose of the first object relative to the coordinate or location data of corresponding tracking points of an immediately preceding rendered pose of the first object.

FIG. 4 illustrates an example computing apparatus 400 for implementing systems and methods for generating enhanced motion data and rendering objects, consistent with embodiments of this disclosure. The number and arrangement of components in FIG. 4 are provided for purposes of illustration and are not limiting. Other embodiments and arrangements may be provided, consistent with the present disclosure. For example, one or more physics engines and/or rendering engines may be provided depending on the needs, objectives, and/or requirements of each implementation. In some embodiments, multiple instances of physics engine and rendering engine may be carried out and executed at the same time to increase data processing and throughput for multiple objects and/or tracking points.

As shown in FIG. 4, computing apparatus 400 includes a number of components, such as a bus 402 and/or other communication components for communicating data and one or more hardware processor(s) 404 communicatively coupled with bus 402 for receiving, processing, and transmitting data. Processor(s) 404 may include, for example, a general-purpose microprocessor or central processing unit. In the example of FIG. 4, computing apparatus 400 also includes a main memory 406, such as a random access memory (RAM) or other dynamic storage devices, coupled to bus 402 for storing data and programmable instructions to be executed by processor(s) 404 and other processing components, such as physics engine 416 and rendering engine 418. Main memory 406 also may be used for storing temporary variables or other intermediate information during the execution of instructions to be executed by processor(s) 404 and other processing components. Such instructions, when stored in non-transitory storage media accessible to processor(s) 404 and other processing components, render computing apparatus 400 into a special-purpose machine that is customized to perform the operations specified in the instructions. Computing apparatus 400 further includes a read only memory (ROM) 408 or other static storage device coupled to bus 402 for storing static data and instructions for processor(s) 404 and other processing components. A storage device 410, such as a magnetic disk or optical disk, can also be provided and coupled to bus 402 for storing other data and instructions.

In some embodiments, computing apparatus 400 may include one or more other components coupled via bus 402 to process, communicate, and share data. For example, one or more displays 412 may be provided, such as a cathode ray tube (CRT), liquid crystal display, virtual reality device, and/or other display or screen, for displaying virtualized settings or graphical information to a viewer. In some embodiments, display 412 may be configured to display rendered objects in virtualized settings that are generated by physics engine 416 and rendering engine 418, consistent with embodiments of the present disclosure. Each of physics engine 416 and rendering engine 418 may be implemented with one or more processors and/or trained machine learning modules configured to perform the operations, features, and methods disclosed herein. Motion data 414 may include a storage device, buffer, or other memory for receiving and communicating motion data to and from the components of computing apparatus 400. The motion data may include raw motion data collected from a physical setting and enhanced motion data may be generated by physics engine 416. In some embodiments, an input device (not shown) such as a camera or sensor tracking apparatus captures and provides raw motion data to component 414. The physics engine 416 may generate enhanced motion data based on the raw motion data and other data (such as weighting values) stored in main memory 406. The physics engine 416 may also generate pose data (e.g., enhanced collision phase pose data and enhanced recovery pose data) and store it in a pose queue or other storage location maintained by main memory 406. The rendering engine 418 may render objects in a virtualized setting based on combinations of motion data (raw and/or enhanced motion data) and poses generated by the physics engine 416.

Computing apparatus 400 may implement the disclosed embodiments herein using customized hard-wired logic, one or more ASICs or FPGAs, firmware, software and/or program logic, which in combination causes or programs computing apparatus 400 to be a special-purpose machine. In some embodiments, the operations, functionalities, and techniques disclosed herein are performed by computing apparatus 400 in response to processor(s) 404 and other processing components executing one or more sequences of one or more instructions included in main memory 406. Such instructions may be read into main memory 406 from another storage medium, such as storage device 410. Execution of the sequences of instructions included in main memory 406 causes processor 404 to perform process steps consistent with disclosed embodiments. In some embodiments, hard-wired circuitry of firmware may be used in place of or in combination with software instructions.

The term "storage media" may refer, but is not limited to, to any non transitory media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 402. Transmission media may also take the form of acoustic or light waves, such as those generated during radio-wave and infrared data communications.

Various forms of media may be involved in carrying one or more sequences of one or more instructions to processor(s) 404 for execution. For example, the instructions may initially be carried on a magnetic disk or solid-state drive of a remote computer. The remote computer may load the instructions into its dynamic memory and send the instructions over a network line communication line using a modem, for example. A modem local to computing apparatus 400 may receive the data from the network communication line and may place the data on bus 402. Bus 402 carries the data to main memory 406, from which processor(s) 404 and other processing components retrieve and execute the instructions. The instructions received by main memory 406 may optionally be stored on storage device 410 either before or after execution by processor(s) 404 and/or other processing components.

Computing apparatus 400 also includes a communication interface 420 coupled to bus 402. Communication interface 418 provides a two-way data communication coupling to a network link 422 that is connected to a network, such as a local network or public network. For example, communication interface 420 may be an integrated services digital network (ISDN) card, cable modem, satellite modem, or a modem to provide a data communication connection to a corresponding type of telephone line or data network. As another example, communication interface 420 may be a local area network (LAN) card to provide a data communication connection to a compatible LAN. Communication interface 420 may also use wireless links (e.g., WiFi) and communicate to public networks such as the Internet. Communication interface 420 may send and receive electrical, electromagnetic, and/or optical signals that carry digital data streams or files representing various types of information.

Network link 422 may provide data communication through one or more networks. For example, network link 422 may provide a connection through a local network to other computing devices connected to the local network or to an external or public network, such as the Internet or other Wide Area Network (WAN). These networks use electrical, electromagnetic, and/or optical signals that carry digital data streams. The signals through the various networks and the signals on network link 422 and through communication interface 420, which carry the digital data to and from computing apparatus 400, are examples of forms of transmission media. Computing apparatus 400 may send messages and receive data, including program code, through the network(s), network link 422 and communication interface 420. In the Internet example, a server (not shown) may transmit requested code for an application program through the Internet (or Wide Area Network), the local network, and communication interface 420. The received code may be executed by processor(s) 404 and/or other processing components as it is received and/or stored in storage device 410 or other non-volatile storage for later execution.

FIG. 5 is a flowchart illustrating an example method 500 for generating enhanced motion data and rendering objects, consistent with embodiments of this disclosure. Method 500 may be implemented with computing apparatus and system components, such as the embodiments disclosed herein (see, e.g., FIGS. 4, 8, and 9). In some embodiments, method 500 may be performed by at least one processor of a computer-implemented apparatus or system. In some embodiments, the at least one processor includes a physics engine and/or a rendering engine implemented according to embodiments of the present disclosure. Example steps and operations for method 500 are described below. It will be appreciated that these steps and operations may be combined, modified, and/or rearranged in any order depending on the application and implementation.

As illustrated in FIG. 5, at step 501, raw motion data for a first object is received. For example, raw motion data may be received by a physics engine for processing. The raw motion data may be provided over a network and/or from a memory (e.g., a buffer or other storage location). Before it is received by the physics engine, the raw motion data may be captured or generated using any of any number techniques, such as through a motion capture suit with a plurality of sensors corresponding to tracking points of the first object or through sensor-less computer vision technology applied to a camera feed or prior recording. In some embodiments, the raw motion data is captured or generated when an entity (e.g., a human actor) or thing (e.g., a non-human object) corresponding to the first object is moving in a physical setting (such as a stage, a studio, a filming location, a playing field, a sports arena, etc). By way of example, the raw motion data may be captured by or generated from one or more sensors, receivers, or cameras which track and record the movement of the first object in real time and/or computer vision technology which tracks and records movement of the first object from a live event or pre-recorded data. As part of step 501, the raw motion data may be provided as input to the physics engine. The raw motion data may include coordinates or location data for each of a plurality of tracking points for the first object and/or other objects. The raw motion data may also include timestamp or sequence number data so that movements of the first object can be determined over time or in one or more sequences. In some embodiments, the raw motion data also includes vector force data.

At step 502, the received raw motion data is processed to render the first object. For example, the raw motion data may be processed by a physics engine to generate a sequence of poses of the first object and the poses may be used by a rendering engine to render the first object in a virtualized setting or environment. The rendering of the first object may include generating a fully animated version of a character or other entity or thing associated with the first object. In some embodiments, the raw motion data associated with each of a plurality of tracking points of the first object is used by a physics engine in combination with a rendering engine to render the first object in the virtualized setting. As raw motion data is received and processed over time or over a sequence (repeating at least steps 501 and 502 of the example method 500), movements of the first object can be rendered in the virtualized setting, with the movements being determined from changes in the raw motion data associated with the tracking points of the first object. In some embodiments, the rendered first object may be displayed in the virtualized setting alongside the animation of other objects and/or a background scene.

At step 503, a determination is made whether there is a collision of a second object with the first object within the virtualized setting. For example, using the raw motion capture data, the physics engine may detect at step 503 that a second object has entered a trigger area of at least one of the plurality of tracking points of the first object. The location and movement of the second object may be a separately tracked object using raw motion data and/or the second object may be an animated object in the virtualized setting that is tracked independently by the physics engine or the rendering engine. In some embodiments, as part of step 503, physics engine may determine if the second object will eventually collide with the first object. This operation to confirm a pre-collision event may be based on, e.g., force vector data and/or movement data indicating a force and/or direction of the second object relative to a position or location of the first object and its trigger areas. Additionally, or alternatively, a collision detection between the first object and the second object may occur when it is determined that at least a portion of the second object has entered into one or more trigger areas associated with one or more tracking points of the first object. In some embodiments, the size of each trigger area may be set larger than the size of its corresponding tracking point and/or adjusted according to a desired detection sensitivity. Generally, providing a trigger area that is larger than a corresponding tracking point allows for the detection of an upcoming collision prior to the actual moment of collision between the first object and the second object (i.e., where the second object overlaps or coincides with a trigger point of the first object in the virtualized setting). In some embodiments, one or more force vectors associated with the first object, or associated with one or more tracking points of the first object, may also be taken into account by the physics engine to determine displacement of tracking points. It will be appreciated that the number of objects that are tracked and compared relative to their position and the trigger areas of the first object may also vary and include multiple objects that are simultaneously analyzed by the physics engine for entry into a trigger area and collision with the first object. For example, in some embodiments, a third and/or fourth object within the virtualized setting may also be detected and determined to collide with the first object either simultaneously with the second object or at a different point in time relative to the collision between the first object and the second object. Steps 503-505 may be performed for each such collision and the example method 500 is not limited to single collision events with a second object.

At step 504, and in response to the detection at step 503 of the second object (and/or further objects) entering the one or more trigger areas of the first object, the physics engine may be initiated or applied to generate enhanced motion data for the first object. The enhanced motion data for the first object may comprise collision phase data and, optionally, recovery phase data (i.e., recovery data). As disclosed herein, the enhanced motion data may be generated to animate the first object, including a resultant displacement or change in the position of at least a portion of the first object, due to the collision with the second object. In some embodiments, the physics engine is initiated or applied to generate enhanced motion data just prior to the second object entering the one or more trigger areas, e.g., when the second object is determined to be within a threshold distance of a trigger area. In some embodiments, the physics engine may be continuously running and applied upon the entering of the second object into the one or more trigger areas. With the enhanced motion data, the coordinates or locations of one or more tracking points of the first object, as indicated by the raw motion data, are adjusted by the physics engine in response to the collision with the second object (and/or further objects detected to collide with the first object). The tracking points that are adjusted with the enhanced motion data may be identified based on the tracking point(s) where the second object impacts the first object and other tracking points proximate to the impacted tracking point(s). As further disclosed herein, force vector(s) and a weighting value table may be used to identify the relevant tracking points for a collision and make the corresponding adjustments with the enhanced motion data. An example method for generating enhanced motion data is described below with reference to FIG. 6.

In some embodiments, the enhanced motion data is generated based on weights (i.e., weighting values) assigned to one or more tracking point(s) of the first object, as indexed or determined by a table, the force vector(s) of the second object, the effects between tracking points of the first object, as determined by an inverse kinematic function, and the duration of a collision phase and/or a recovery phase, as determined by a momentum decay function. The enhanced motion data may be used to generate a first series of poses for a collision phase and, in some embodiments, a second series of poses for a recovery phase. In some embodiments, the first series of poses for the collision phase are generated by a machine learning collision pose generation module. These collision poses may be sequentially pushed to a pose queue, where they are temporarily stored. In some embodiments, each collision pose is generated by calculating a displacement of each tracking point of the first object relative to a directly preceding pose of the first object. The displacement can be calculated based on, e.g., the weighting value assigned to each tracking point of the first object, as determined by a table, the force vector(s) of the second object, the effects between tracking points of the first object, as determined by an inverse kinematic function, and the duration of a collision phase and/or a recovery phase, as determined by a momentum decay function. In some embodiments, the second series of poses are generated by a machine learning recovery pose generation module. These recovery poses may be sequentially pushed to a pose queue, where they are temporarily stored. In some embodiments, each sequential recovery pose is generated by calculating a displacement of each tracking point of the first object relative to a directly preceding pose of the first object. The displacement may be calculated based on, e.g., machine-learned poses of a given character associated with the first object and/or an interpolation function (e.g., a linear interpolation function).

As disclosed herein, a rendering engine may be used to animate and render the first object in the virtualized setting. In some embodiments. the rendering engine may pull consecutive poses of the first series of poses (i.e., poses for the collision phase) and the second series of poses (i.e., poses for the recovery phase) from the pose queue(s). Over time or a sequence, the rendering engine may be responsible for determining a next position of the first object to be rendered in a next frame of the virtualized setting.

Referring again to FIG. 5, at step 505, the enhanced motion data generated in step 504 may be used to render the first object. For example, the enhanced motion data and/or poses may be used by a rendering engine to render the first object in a virtualized setting. As part of step 504, the enhanced motion data may be used to display the displacement or result from the collision between the first object and the second object. Over time or a sequence (i.e., while performing and repeating the steps of example method 500, including step 504 for successive sets of generated enhanced motion data during one or more phases, including a collision phase and a recovery phase), the rendering engine may pull collision poses in sequential order from a pose queue to create each consecutive frame including the first object within the virtualized setting. In some embodiments, the rendering engine may use of a set of collision poses (i.e., during a collision phase) followed by a set of recovery poses (i.e., during a recovery phase). The first object is thereby animated in response to the collision with the second object within the virtualized setting and with enhanced motion data for the first object to more accurately reflect the collision and response to the forces thereof. For some tracking points of the first object, there may be no adjustment or displacement in position relative to that defined by the raw motion data because those tracking points are not influenced by the collision with the second object or are not sufficiently proximate to tracking points impacted or influenced by the collision by the second object. Thus, the raw motion data is collected during the collision and/or recovery phases and may be used for rendering some tracking points of the first object. Once the collision and/or recovery phases are complete, i.e., there are no displacements and the enhanced motion data matches the raw motion data for all tracking points of the first object, the application of the physics engine to generate enhanced motion data may be terminated (until the next collision) and the raw motion data may be used to render the first object in the virtualized setting by the rendering engine.

FIG. 6 is a flowchart illustrating an example method 600 for generating enhanced motion data, the enhanced motion data comprising collision phase data and, optionally, also recovery data, consistent with embodiments of this disclosure. The example method 600 may be used for performing step 504 of FIG. 5. To implement method 600, a physics engine may be used that is configured to generate enhanced motion data, consistent with the teachings of the present disclosure. The enhanced motion data may be used to adjust the rendering of the first object in a virtual setting, as disclosed herein. By way of further example, method 600 may be implemented with computing apparatus and systems, such as those disclosed herein (see, e.g., FIGS. 4, 8, and 9). In some embodiments, method 600 may be performed by at least one processor of a computer-implemented system, such as a processor configured to implement a physics engine and the steps and operations of method 600. The respective steps and operations for method 600 are described below. It will be appreciated that the steps and operations may be combined, modified, and/or rearranged in any order depending on the application and implementation.

As illustrated in FIG. 6, at step 601, the at least one processor determines at least one force vector of a second object that is part of a detected collision with a first object. The force vector may be stored in memory or provided as part of motion data for the second object. In some embodiments, as part of step 601, the at least one processor may further determine at least one force vector of the first object during the detected collision with the second object. This force vector may be stored in memory or provided as part of motion data for the first object. The physics engine may use the force vectors associated with the first and second objects to generate enhanced motion data. In cases where the first object is stationary, only the force vector of the second object may be utilized by the physics engine to generate the enhanced motion data. Additionally, or optionally, as part of step 601, the at least one processor may determine a phase model which will be utilized by the physics engine for the detected collision. In some embodiments, one or more phase models may be provided to configure a physics engine and/or rendering engine. Each phase model may enable a unique set of executable instructions and processes for generating enhanced motion data and poses in response to the detected collision. In some embodiments, the phase model may comprise or correspond to a machine learning (ML) module that is trained to provide specific processing for generating enhanced motion data and poses in response to the detected collision. The phase model may be selected from, e.g., a collision phase model, a collision and recovery phase model, or a ragdoll physics model. The collision phase model may enable the generation of enhanced motion data and enhanced collision poses for only a collision phase. The collision and recovery phase model may enable the generation of enhanced motion data and enhanced collision poses for both a collision phase and a recovery phase. The ragdoll physics model may enable a separate set of instruction for generating conventional ragdoll physics and response by the first object to the detected collision. The phase model determination may be based on, e.g., the characteristics or parameters associated with the second object (e.g., size, velocity, direction of movement, force strength or level, etc.). In some embodiments, one or more characteristics of the second object may be compared to predetermined thresholds to determine which phase model should be selected for the collision. Additionally, or alternatively, a default or prime phase model may be manually selected or set by an administrator and stored in memory (e.g., a phase model setting parameter) that is reviewed by the at least one processor to determine the phase model setting.

At step 602, the physics engine is applied for at least the collision phase. In some embodiments, at step 602, the physics engine 802 is applied for the collision phase and the recovery phase. In other embodiments, the physics engine 802 is applied after determining both the force vector for the second object and the weights assigned to the tracking points. In yet other embodiments, the physics engine 802 is applied prior to the determination of a force vector for the second object and the determination of weights assigned to the tracking points. In some embodiments, at step 602, the physics engine 802 is applied to generate a ragdoll physics model (e.g., if the force vector and/or other characteristics associated with the second object are above certain threshold value(s)). At step 603, the physics engine 802 determines the weights to be assigned to each tracking point of the first object. As disclosed herein, the weighting values may be stored and pulled from a table or other storage location in memory. In some embodiments, weighting values are provided for each tracking point of the first object. The weighting values may be tunable and there may be different sets of weighting values based on the type or characteristics of the first object and/or second object, as well as the types or characteristics of the collision. Weighting values may also be associated with different phase models. In some embodiments, a plurality of weighting values is provided and assigned to each tracking point. As described with reference to FIG. 3B, weighting values may be selected based on a distance or number of degrees of separation of each tracking point to a point of the collision between the first object and the second object.

At step 604, the physics engine may generate, for a collision phase, a first set of enhanced motion data for the tracking points of the first object based on the corresponding weighting values assigned to each tracking point. As disclosed herein, the enhanced motion data may also be generated based on a set of force/impulse vectors calculated by a collision module using the kinetic energies, momentums, elasticities, and potentially other physics properties of either or both of the first and/or second objects. By way of example, the enhanced motion data for a tracking point may be calculated as a function of the raw motion data for that tracking point plus a determined displacement. The displacement may comprise a displacement value that is determined based on whether the tracking point is a directly impacted tracking point (i.e., a tracking at or closest to the point of impact of the collision) or an adjacent tracking point (i.e., a tracking point that is proximate to the directly impacted tracking point(s). For example, the displacement for a directly impacted tracking point may be calculated as follows:

displacement $(j_0)$=weight$((j_0))$*collision physics (magnitude and direction of force of the first and/or second object)    (i)

where "$(j_0)$" is a directly impacted tracking point, "weight $(j_0)$" is the weighting value assigned to the directly impacted tracking point, and "collision physics" is a conventional physics engine algorithm that applies the force vector of the second object, including the magnitude and direction of the force imparted by the second object colliding with the first object. As disclosed herein, there may be one or more directly impacted tracking points (see, e.g., FIG. 3B). To determine the displacement of tracking points that are proximate to the directly impacted tracking point(s) (i.e., tracking points of the first object that are one or more tracking points away from the point of impact of the collision), another algorithm may be used that is based on an inverse kinematic function (Ik), a momentum decay, and the weighting value assigned to that tracking point. For example, the displacement for an approximate tracking point may be calculated as follows:

displacement $(j_i)$=weight$(j_i)$*Ik function$(j_{i-1})$*momentum decay (time since collision)    (ii)

where "$(j_i)$" is the current adjacent tracking point, "weight $(j_i)$" is the weighting value assigned to that current adjacent tracking point, "Ik function$(j_{i-1})$" is an inverse kinematic function applied to the displacement values of the next adjacent tracking point with 1 less degree of separation, and "momentum decay (time since collision)" is a momentum decay function applied to the time since the collision as measured at or related to the impact to that current adjacent tracking point. It will be appreciated that the above displacement algorithms (i) and (ii) are examples and that they may be modified, combined, situationally used, or substituted with other algorithms for calculating the displacement for tracking points of the first object, in view of the teachings of the present disclosure.

As part of step 604, the physics engine may apply the determined enhanced motion data to generate a corresponding set or sequence of enhanced collision poses for the first object. Each enhanced collision pose may reflect adjustments to the pose of the first object in response to the collision with the second object. The enhanced motion data and enhanced collision poses may be generated in accordance with the features and embodiments discussed herein, including with reference to the example embodiments of FIGS. 2-6 and 8-9. As will be appreciated from this disclosure, the generated enhanced motion data allows for a sequential displacement of certain tracking points of the first object, the displacement of each tracking point being dependent on, e.g., its assigned weighting value, the at least one force vector of the second object, an inverse kinematic function, and a momentum decay function. The inverse kinematic function may be used to determine the effect on each tracking point of the movement of other tracking points proximate and connected to that tracking point. The momentum decay function may be used to determine a duration of the collision phase.

At step 605, which is optional, the physics engine may further generate, during a recovery phase, a second set of enhanced motion data comprising recovery data. The recovery data may be generated by applying an interpolation model and/or a tunable recovery model. For example, to generate the recovery data, the physics engine may utilize an interpolation model (e.g., a linear interpolation, a weighted interpolation, or a custom interpolation function) and/or a tunable recovery module (e.g., a machine learning recovery pose generation module). The duration of the recovery phase may be determined from a momentum decay function. At the end of the recovery phase, there are no displacements, and all tracking points are returned and rendered based on their corresponding raw motion data. The recovery data and enhanced recovery poses may be generated in accordance with the features and embodiments discussed herein, including with reference to the example embodiments of FIGS. 2-6 and 8-9.

FIG. 7 illustrates the relationship between the drawings of FIGS. 8A-8C. As shown in FIG. 7, FIG. 8B is continued from FIG. 8A, and FIG. 8C is continued from FIG. 8B. The complete diagram shown in FIGS. 8A-8C spans three pages.

FIGS. 8A-8C illustrate an example processing pipeline and pose queue for generating enhanced motion data and rendering objects, consistent with embodiments of this disclosure. FIG. 8B is continued from FIG. 8A, and FIG. 8C is continued from FIG. 8B. The example embodiment of FIGS. 8A-8C may be implemented with the computing apparatus and features disclosed herein, including one or more processors (a physics engine, a rendering engine, and so on), captured raw motion data, a weighting value table, a pose queue or memory buffer, and the like. Implementations of FIGS. 8A-8C may be used for providing enhanced motion data and real-time rendering of objects in a virtualized setting. As used herein, the term "real time" refers to rendering objects at or near the same time as processing raw motion data, detecting collisions, and generating enhanced motion data and poses.

Embodiments consistent with FIGS. 8A-8C may be implemented to generate enhanced motion data and poses in response to a detected collision between a first object and a second object and render a sequence of frames which includes a first series of frames during at least a collision phase of the first object and, in some embodiments, a second series of frames during a recovery phase of the first object. FIGS. 8A-8C may also be implemented to process raw motion data and render the first object during a pre-collision phase (i.e., before a collision with the second object is detected). It will be appreciated that the example pipeline and pose queue of FIGS. 8A 8C may be modified to implemented to process multiple detected between the first object and other objects by, for example, initiating multiple pipelines and queues simultaneously or in a staggered chain, with each pipeline and corresponding queue instantiation processing data and frames for at least one collision.

In FIG. 8A, "Frame-1" represents at least one frame of the virtualized setting rendered by a rendering engine for display during a pre-collision phase (i.e., prior to a collision between the first object and another object (e.g., a second object). During a pre-collision phase, a physics engine may process raw motion captured ("mocap") data and generate poses for the first object using conventional engine physics. Each of these poses may be put in a queue or buffer before they are rendered by the rendering engine. "Frames 0-3," as shown in FIG. 8A, represent the first three (or more) frames of the first series of frames processed during a collision phase. Frames 0-3 may be rendered by a rendering engine based on enhanced motion data and enhanced collision poses generated by a physics engine, consistent with embodiments disclosed herein. This portion of the pipeline and pose queue may coincide or start from when a collision is detected between the first object and second object and continue through the duration of the collision phase. During the collision phase, the physics engine may implement a collision phase model. The collision phase model may include a set of executable instructions for configuring at least one processor for processing raw motion data and generating enhanced motion data and enhanced collision poses, in accordance with the embodiment disclosed herein. In some embodiments, the collision phase model may comprises a machine learning (ML) collision pose generation module implemented with one or more trained neural networks. The collision pose generation module may process the raw motion data and generate enhanced motion data (including displacement data) and enhanced collision poses of the first object during the collision phase (i.e., "collision pose 1" through "collision pose X"). Each enhanced collision pose of the first object may be generated based on displacement data for the coordinates of each tracking point relative to a preceding collision pose's coordinates of each tracking point. As disclosed herein, the displacement for each tracking point may be calculated based on, e.g., the tracking point's assigned weight, at least one determined force vector of the second object, built-in physics, an inverse kinematic function, and/or a momentum decay function. Each enhanced collision pose for the first object may be pushed to the pose queue or other storage location where it is temporarily stored or buffered. Every sequential frame of the collision phase (i.e., "Frame 1" through "Frame X") may be rendered by the rendering engine based on each corresponding collision pose for the first object pulled from the pose queue or temporary storage. As disclosed herein, collision poses may be retrieved sequentially or in consecutive order from the pose queue.

As illustrated in FIG. 8B, the pipeline may include a recovery phase that follows the collision phase. As part of the recovery phase, the raw motion data may be processed by the physics engine to generate recovery data and enhanced recovery poses for the first object. For this phase of the pipeline, the physics engine may implement a recovery phase model. The recovery phase model may include a set of executable instructions for configuring at least one processor for processing raw motion data and generating recovery data and enhanced recovery poses, in accordance with the embodiment disclosed herein. In some embodiments, the recovery phase model may comprise a machine learning (ML) recovery pose generation module implemented with one or more trained neural networks. The recovery pose generation module may process the raw motion data and generate recovery data (including displacement data) and enhanced recovery poses for the first object. The enhanced recovery poses ("recovery pose 1" through at least "recovery pose n") may be pushed in sequential order to the pose queue or buffer. In some embodiments, each pose of the set of recovery poses may be generated based on the recovery data. The recovery data may include recovery phase displacement data which is calculated for the coordinates of each tracking point relative to corresponding tracking point coordinates in a preceding recovery pose. The recovery phase displacement data may be calculated based on an interpolation function or machine-learned responses based on the characteristics associated with the first object and recovery path from the detected collision. Each recovery pose may be pushed and temporarily stored in the pose queue in sequential order. Each sequential frame of the recovery phase (i.e., "Frame X+1" through at least "Frame X+n") may be rendered by the rendering engine based on the corresponding recovery pose it pulls from the pose queue in a consecutive order.

In some embodiments, the physics engine or recovery pose generation module also determines offset values between the positions of the tracking points defined by the recovery pose versus the raw motion data. If the greatest offset value is determined to be below a threshold value, then the recovery phase may be determined to be at or near completion. Processing may then be modified such that any remaining recovery poses in the pose queue are ignored and the recovery model processing is terminated. As illustrated in FIG. 8C, an interpolation function may be performed by the physics engine to generate interpolated poses for one or more frames that are rendered by the rendering engine before returning to a pre-collision phase of processing without displacements or enhanced motion data. The interpolation function may comprise an interpolation between the raw motion data and recovery data to return or match the character pose to the raw motion data. The interpolation occurs for a set number of frames (e.g., "Frame X+n+1" through "Frame X+n+y") until the recovery pose, as rendered by the rendering engine, matches the pose based on the raw motion data. Once the recovery pose matches the pose from raw motion data (i.e., the offset equals the raw data), the interpolation function ends and the physics engine returns to processing the raw motion data under a pre-collision state (i.e., without displacements or enhanced motion data), and the first object is rendered using poses generated only from the raw motion data (i.e., at "Frame X+n+y+1" and so on until the next detected collision).

FIG. 9 illustrates an example computing system 900, consistent with embodiments of this disclosure. Computing system 900 may be implemented with one or more processors, a memory, a bus, a communications or network interface and/or other components (see, e.g., components of FIG. 4). The components may comprise any suitable combination of hardware, software, and/or firmware. In some embodiments, the components of computing system 900 include one or more trained neural networks implemented with one or more processors and executable instructions. It will be appreciated that the number and arrangement of components show in FIG. 9 are provided for illustration and may be modified, updated, or revised without departing from the scope of this disclosure and the appended claims.

As shown in FIG. 9, computing system 900 includes a physics engine 902 that processes data and communicates with one or more other components. In some embodiments, the physics engine 902 comprises a collision phase module 904 and a recovery phase module 906. The collision phase module 904 and the recovery phase module 906 may each be implemented with one or more processors or neural networks, as well as other components. By way of example, the collision phase module 904 may include a physics module 914, a weighting value table 901, a momentum decay function 916, an inverse kinematics function 918, and a machine learning (ML) collision pose generation module 920. The physics module 914 may implement conventional engine physics to process raw motion data 914 and determine enhanced motion data and poses, including displacement data of one or more tracking points of the first object as a result of at least one force vector acting on the first object (e.g., due to a detected collision occurring in the virtualized setting between the first object and a second object). The weighting value table 901 stores tunable weights, a selection of which are assigned to particular tracking points of the first object depending on their distance or degree of separation from an impact point of a collision in the virtualized setting between the first object and a second object. The inverse kinematics function 918 may be used to assist with determining the displacement of the first object at each tracking point as a result of the collision. For example, the inverse kinematics function 918 may be applied to determine the effect of the displacement of other tracking points proximate to a tracking point influenced by the collision. The momentum decay function 916 may be applied to assist with determining the duration of the displacement of the tracking points of the first object at each tracking point as a result of the collision. For example, the momentum decay function may be applied to determine the duration of a collision phase. During the collision phase, a number of collision poses may be generated by physics module 914 or they may be generated by the collision phase module 904 via the ML collision pose generation module 920. In some embodiments, collision poses may be generated by the ML collision pose generation module 920 based on the enhanced motion data (including displacement data) calculated by it and/or in combination with the physics module 914, the table 901, the inverse kinematics function 918, and the momentum decay function 916.

As further illustrated in FIG. 9, the recovery phase module 906 comprises an interpolation function 908 and a machine learning (ML) collision pose generation module 920 for recovery pose generation. The collision pose generation module 920 generates successive recovery poses during a recovery phase, which follows a collision phase. Each successive recovery pose may adjust the position of one or more tracking points of the first object relative to their positions determined by the raw motion data. As disclosed herein, recovery poses may be generated until the offset with respect to the raw motion data is below a threshold value. Once the offset is below the threshold value, the interpolation function 908 may be executed until the generated pose is brought back to the raw motion data.

As further shown in FIG. 9, poses generated by the collision phase module 904 and the recovery phase module 906 may be pushed and stored in a pose queue 910. Both the collision phase poses and the recovery phase poses may be stored in sequential order into the pose queue 910. A rendering engine 912 may pull or retrieve the poses in sequential order from the poses queue to render the first object in the virtualized setting. This process may be carried out during the collision phase and the following recovery phase.

In some embodiments, an enhanced pose for the collision phase (i.e., enhanced collision pose) or the recovery phase (i.e., enhanced recovery pose) comprises a set of enhanced motion data for each tracking point of the first object that is impacted from the collision with the second object. As disclosed herein, the enhanced motion data indicates the amount of displacement of the tracking point relative to its position indicated by the raw motion data. In some embodiments, coordinates for rendering each tracking point are generated based on the next pose to be generated. In some embodiments, relative coordinates for each tracking point are generated based on a first pose (i.e., the coordinates of tracking points in a directly preceding pose) of the first object and a second pose (i.e., the coordinates of tracking points in a next pose) of the first object. Frame-to-frame, the position of some tracking points may not change. Advantageously, this can improve processing efficiency and throughput. By way of example, the collision phase module 904 (and/or the recovery phase module 906) may collect enhanced motion data comprising the first pose coordinates and generates the second pose coordinates based on the change from the first pose coordinates. Each first (input) pose generated by the collision phase module 904 (or the recovery phase module 906) comprises coordinate data from an immediately preceding frame in the virtualized setting, the immediately preceding frame comprising either raw motion data, enhanced motion data, or a combination thereof. Each second (output) pose generated by the collision phase module 904 (or the recovery phase module 906) comprises updated coordinate data comprising each tracking point's position relative to the input pose coordinate data received. In some embodiments, each set of enhanced motion data may be provided to the collision pose generation module 920 (or to the recovery pose generation module 909), where a next collision pose (or recovery pose) is generated from the enhanced motion data (or recovery data). Each generated collision pose (or recovery pose) is then transmitted to the pose queue 910. The rendering engine 910 then pulls each collision pose (or recovery pose) from the pose queue 910 and renders the first object based on that collision pose (and/or recovery pose) in a virtualized setting. The rendering engine 911 can also render the first object using poses based on raw motion data when processing is performed outside of the collision and/or recovery phases (e.g., during a pre-collision phase).

As will be appreciated from this disclosure, the embodiments herein may be implemented through any suitable combination of hardware, software, and/or firmware. Modules and components of the present disclosure may be implemented with programmable instructions implemented by a hardware processor. In some embodiments, a non-transitory computer-readable storage medium including instructions is also provided, and the instructions may be executed by a processor device for performing the above-described steps and methods. Common forms of non transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory. Examples of networks for supporting the herein described connections and communication of data feeds and information include private and public networks, including intranets, local area networks, and wide area networks (including the Internet). Such networks may include any combination of wired and wireless networks and support associated communication protocols.

It should be noted that, the relational terms herein such as "first" and "second" are used only to differentiate an entity or operation from another entity or operation, and do not require or imply any actual relationship or sequence between these entities or operations. Moreover, the words "including," "having," "including," and "including," and other similar forms are intended to be equivalent in meaning and be open ended in that an item or items following any one of these words is not meant to be an exhaustive listing of such item or items, or meant to be limited to only the listed item or items.

Unless specifically stated otherwise herein, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. Furthermore, the term "and/or" in this disclosure, unless specifically stated otherwise or infeasible, is used interchangeably with and considered equivalent as the term "or."

It is appreciated that the above-described embodiments may be implemented by hardware, or software (program codes), or a combination of hardware and software. If implemented by software, it may be stored in the above-described non transitory computer-readable media. The software, when executed by the processor may perform the disclosed methods. The computing units and other functional units described in this disclosure may be implemented by hardware, or software, or a combination of hardware and software. One of ordinary skill in the art will also understand that the above-described servers may be combined as one server, and each of the above-described servers may be further divided into a plurality of sub-servers. For example, there may be a single physical computer for the data integration server, the website server, and the award management server.

In the foregoing specification, embodiments have been described with reference to numerous specific details that may vary from embodiment to embodiment. Certain adaptations and modifications of the described embodiments may be made. Other embodiments may be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art may appreciate that these steps may be performed in a different order while implementing the same method.

What is claimed is:

1. A computer-implemented system, the system comprising:
    at least one processor; and
    at least one non-transitory computer-readable medium storing instructions that are executed by the at least one processor to perform operations, comprising:
    receiving raw motion and/or physics data for a first object, the raw data being captured in a physical setting or provided by prerecorded, programmatically generated, or alternatively animated media sources and comprising data for a plurality of tracking points associated with the first object;
    rendering the first object in a virtualized setting based on the raw motion data;
    detecting, in the virtualized setting, a collision with a second object based on an entry of the second object within a trigger area associated with at least one tracking point of the first object;
    generating, in response to detecting the collision with the second object, enhanced motion data for the least one tracking point of the first object, wherein generating the enhanced motion data includes determining a displacement of the at least one tracking point of the first object based on at least a force vector of the second object during a collision phase between the first object and the second object; and
    further rendering, based on the enhanced motion data, the first object in the virtualized setting, wherein the operations performed by the at least one processor further comprise applying a physics engine to generate the enhanced motion data during a sequence of phases, including:
    a pre-collision phase prior to the entry of the second object into the trigger area;
    the collision phase, the collision phase initiating upon the entry of the second object into the trigger area and terminating upon a rendering of the first object with a maximum displacement resulting from the collision with the second object; and
    a recovery phase, the recovery phase initiating upon an end of the collision phase and terminating after a duration determined from a momentum decay function.

2. The system of claim 1, wherein the operations performed by the at least one processor further comprise generating the enhanced motion data for the at least one tracking point as a function of the raw motion data and the determined displacement of the at least one tracking point.

3. The system of claim 1, wherein the operations performed by the at least one processor further comprise generating enhanced motion data for other tracking points proximate to the at least one tracking point of the first object.

4. The system of claim 3, wherein the operations performed by the at least one processor further comprise determining a displacement for each of the other tracking points proximate to the at least one tracking point of the first object, the determined displacement for each of the other tracking points proximate to the at least one tracking point being dependent on a number of degrees of separation of each of the other tracking points from the at least one tracking point.

5. The system of claim 4, wherein the operations performed by the at least one processor further comprise determining a displacement for each of the other tracking points proximate to the at least one tracking point by applying a weighting value based on the number of degrees of separation.

6. The system of claim 5, wherein the weighting value is a tunable parameter.

7. The system of claim 4, wherein the operations performed by the at least one processor further comprise determining a displacement for each of the other tracking points proximate to the at least one tracking point by applying an inverse kinematic function.

8. The system of claim 7, wherein the inverse kinematic function is tunable.

9. The system of claim 1, further comprising a physics engine including at least one processor configured to generate the enhanced motion data for the least one tracking point of the first object and the other tracking points proximate to the at least one tracking point.

10. The system of claim 1, wherein the operations performed by the at least one processor further comprise generating recovery data for the first object during a recovery phase after the collision phase, wherein the recovery data is generated for the at least one tracking point of the first object and the other tracking points proximate to the at least one tracking point.

11. The system of claim 10, wherein the operations performed by the at least one processor further comprise rendering the first object in the virtualized setting based on the recovery data.

12. The system of claim 10, wherein the operations performed by the at least one processor further comprise generating the recovery data by applying at least one of an interpolation model or a tunable recovery model.

13. The system of claim 10, wherein the operations performed by the at least one processor further comprise determining a duration of at least one of the collision phase and the recovery phase based on a momentum decay function.

14. The system of claim 13, wherein the momentum decay function is tunable.

15. The system of claim 1, wherein the operations performed by the at least one processor further comprise manual or programmatic control of the sequence of phases such that they can be interrupted, canceled, repeated, or applied to select frames of the object.

16. The system of claim 1, wherein the operations performed by the at least one processor further comprise generating, during the collision phase, one or more enhanced collision poses for the first object based on the enhanced motion data, and rendering the first object in the virtualized setting based on the one or more enhanced collision poses.

17. The system of claim 1, wherein the operations performed by the at least one processor further comprise generating, during the recovery phase, one or more enhanced recovery poses for the first object based on the enhanced motion data, and rendering the first object in the virtualized setting based on the one or more enhanced recovery poses.

18. The system of claim 1, wherein the physics engine comprises a machine learning module to generate one or more enhanced poses of the first object based on the enhanced motion data, the machine learning module being trained using extracted motion data and physics data from pre-existing media.

19. The system of claim 1, wherein the physics engine comprises a machine learning module to generate one or more enhanced poses of the first object based on the enhanced motion data, the machine learning module being trained using reproduced collisions.

20. The system of claim 19, wherein the machine learning module is trained by analyzing the reproduced collisions with a generative adversarial network (GAN), the GAN comparing real animations with the reproduced collisions to detect optimal reproduced collisions.

21. The system of claim 1, wherein the raw motion data is captured using at least one of a camera, a motion capture suit, or object detection.

* * * * *